US009573639B1

(12) United States Patent
Furtado

(10) Patent No.: US 9,573,639 B1
(45) Date of Patent: Feb. 21, 2017

(54) WHEEL RETRACTION ASSEMBLY, CART AND RELATED COMPONENTS

(71) Applicant: Anthony G. Furtado, West Babylon, NY (US)

(72) Inventor: Anthony G. Furtado, West Babylon, NY (US)

(*) Notice: Subject to any disclaimer, the term of this patent is extended or adjusted under 35 U.S.C. 154(b) by 0 days.

(21) Appl. No.: 15/094,284

(22) Filed: Apr. 8, 2016

Related U.S. Application Data

(60) Provisional application No. 62/145,572, filed on Apr. 10, 2015.

(51) Int. Cl.
| | | |
|---|---|---|
| *B62D 63/08* | (2006.01) | |
| *B62D 63/06* | (2006.01) | |
| *B62D 61/12* | (2006.01) | |
| *B62B 1/20* | (2006.01) | |
| *B62B 5/06* | (2006.01) | |

(52) U.S. Cl.
CPC ............. *B62D 63/061* (2013.01); *B62B 1/208* (2013.01); *B62B 5/068* (2013.01); *B62D 61/12* (2013.01); *B62D 63/08* (2013.01)

(58) Field of Classification Search
CPC ..... B62D 63/06; B62D 63/061; B62D 63/062; B62D 63/068; B62D 61/12; B62D 61/125; B62B 1/20; B62B 1/208; B62B 5/068
USPC ............................................ 280/30, 656, 43
See application file for complete search history.

(56) References Cited

U.S. PATENT DOCUMENTS

| | | | |
|---|---|---|---|
| 1,094,455 A | 4/1914 | McGill | |
| 2,122,955 A | 7/1938 | Rush | |
| 3,832,932 A | 9/1974 | Even et al. | |
| 5,673,928 A * | 10/1997 | Jury | B62B 1/208 |
| | | | 280/47.24 |
| 6,217,043 B1 * | 4/2001 | Chumley | B62B 1/125 |
| | | | 280/40 |
| 6,585,285 B2 * | 7/2003 | Koch | B62D 63/061 |
| | | | 224/924 |
| 7,059,626 B2 * | 6/2006 | Koch | B62D 63/061 |
| | | | 280/38 |
| 7,556,468 B2 | 7/2009 | Grata | |
| 8,376,381 B2 | 2/2013 | Shalaby et al. | |
| 8,696,012 B2 * | 4/2014 | Oyasaeter | B62D 63/061 |
| | | | 280/491.1 |
| 2007/0126209 A1 * | 6/2007 | Wolfe | B62D 33/03 |
| | | | 280/656 |

(Continued)

*Primary Examiner* — John Walters
(74) *Attorney, Agent, or Firm* — Winston & Strawn LLP

(57) ABSTRACT

The present invention provides a wheel retraction assembly that can be used with a convertible cart for transport of cargo. The convertible cart includes a support structure, first and/or second wheels, each with a retraction assembly that includes telescopic and fixed struts. The wheel retraction assembly is operatively associated with the support structure and is movable between retracted and expanded positions. One end of telescopic strut mounts the wheel axle structure and the opposite end is connected to the support structure. In the retracted position, the wheel retraction assembly maintains the first and/or second wheels in a position to enable the cart to be moved. In the expanded position, the retraction assembly moves the first and/or second wheels to another position to be adjacent the support structure wherein the wheels do not support the cart. The cart also features a convertible handle assembly and a mountable platform.

20 Claims, 29 Drawing Sheets

(56) References Cited

U.S. PATENT DOCUMENTS

2008/0111348 A1* 5/2008 Lawson ................ B60D 1/143
    280/511
2009/0212515 A1* 8/2009 Oyasaeter ............ B62D 63/061
    280/40

* cited by examiner

WHEEL RETRACTION ASSEMBLY, CART AND RELATED COMPONENTS

CROSS-REFERENCE TO RELATED APPLICATION

This application claims the benefit of U.S. provisional application No. 62/145,572 filed Apr. 10, 2015, the entire content of which is expressly incorporated herein by reference thereto.

FIELD OF THE INVENTION

The present invention relates to a wheel retraction assembly that can be used with a cart for transport of cargo, and, in particular embodiments, to a convertible cart for transport of cargo comprising a wheel retraction assembly, a convertible handle assembly, a mountable platform and other useful features.

BACKGROUND OF THE INVENTION

There are a number of references relating to carts for transport of cargo including, for example, U.S. Pat. No. 1,094,455 to McGill ("McGill"), U.S. Pat. No. 2,122,955 to Rush ("Rush"), U.S. Pat. No. 3,832,932 to Even, deceased et al. ("Even"), U.S. Pat. No. 7,556,468 to Grata ("Grata"), and U.S. Pat. No. 8,376,381 to Shalaby et al. ("Shalaby").

McGill discloses a folding go-cart. In particular, the go-cart includes a running gear frame, wheel supports pivoted to fold under the frame crosswise therefore, means connecting the wheel supports together in pairs, a cross-brace pivotally supported and adapted to swing downwardly below the plane of the running gear frame between the connecting means, a second cross-brace pivotally support and adapted to swing downwardly from the plane of the running gear frame, comprising supporting arms and a cross-brace embracing the connecting means, and a cam secured to the cross-brace for engaging the connecting means on one side and causing the wheels on that side to fold in advance of those on the other side.

Rush discloses a collapsible wheel. In particular, the wheel includes a channeled felly, an axle encircling cam annulus having cam surfaces thereon, rod members having their inner ends engaged with the cam surfaces, a collapsible rim, connections between the outer ends of the rods and the collapsible rim, the collapsible rim being radically slidable in the felly, single operating means for rotating the cam annulus, the means comprising a shaft on the annulus, a gear carried by the shaft, a rack secured in stationary position and with which the gear meshes, and a tool-engageable end construction on the shaft.

Even discloses a trailer carriage with collapsible wheels. In particular, the trailer includes a chassis, a turret carried underneath the chassis and provided with a least three feet a set of collapsible wheels which allow the trailer when lowered to run with a sufficient spacing above ground whereas for the raised position of the trailer, the feet of the turret rest on the ground and chassis can revolved round the turret axles. The chassis may carry a tipping platform pivotally secured to the chassis.

Greta discloses a wheel lift system for use with a transporter vehicle. In particular, the wheel lift system includes a boom assembly, a cross bar supported at a distal end of the boom assembly, a first arm supported at the cross bar and configured to move between a stowed position and a use position, and a second arm movably coupled to the first arm and configured to move between a stowed position and a use position. A cam is provided for moving the second arm from the use position to the stowed position. The wheel lift system may optionally include an unfolding mechanism for moving the second arm from the stowed position to the use position.

Shalaby discloses a versatile, collapsible cart-trailer with modular components. In particular, the cart-trailer includes a folding mechanism that folds the cart-trailer into a small form factor, at least two wheels, modular, and removable and compartmentalized storage. The collapsible cart-trailer is operable in a cart mode and a trailer mode. In the trailer mode, the cart-trailer may be coupled to a movable object by a collapsible, length adjustable tow bar. In the cart mode, the cart-trailer includes a collapsible handle.

SUMMARY OF THE INVENTION

In accordance with principles of one embodiment of the present invention, a retractable wheel assembly is disclosed, comprising a support structure having bottom and side portions; a wheel having an axle; a wheel retraction assembly including a fixed strut connecting one end of the wheel axle to the support structure, and a telescopic strut connecting the opposite end of the wheel axle to the support structure; wherein one end of the fixed strut is fixedly mounted to the wheel axle and the other end is pivotally mounted to a side portion of the support structure; and wherein one end of the telescopic strut is fixedly mounted to the wheel axle and the other end is pivotally mounted to the bottom portion of the support structure, with the telescopic strut movable between retracted and expanded positions, wherein the retracted position maintains the wheel in an operative position with the struts positioned essentially perpendicular to the support structure to enable the support structure to be moved upon the first wheel to transport cargo that is placed on the support structure, while in the retracted position the wheel is placed in an inoperative position with the struts essentially parallel to the first support structure.

In accordance with principles of another embodiment of the present invention, a convertible cart for transport of cargo is provided. In one form, the convertible cart comprises a first support structure, a first wheel having an axle, a first wheel retraction assembly operatively associated with the support structure, a fixed strut for mounting one end of the first wheel axle to the first support structure and a telescopic strut connecting the opposite end of the first wheel axle to the first support structure. The telescopic strut is movable between retracted and expanded positions, wherein the retracted position maintains the first wheel in a position to enable the cart to be moved upon the first wheel and the expanded position moves the first wheel to another position adjacent the first support structure wherein it is not supporting the cart by the wheel. The cart may also include a connection attachment member configured and dimensioned for attachment to a trailer hitch of a vehicle for transport of the cart. The cart typically includes a basket or plate member attached to the first support structure for assisting in supporting cargo to be transported by the cart.

In one variation of the above embodiments, the telescopic strut may include first and second rectangular or square tubing sections in sliding engagement. In this variation, the convertible cart may also comprise a quick release connector for maintaining the telescopic strut in the retracted or expanded position. The quick release connector may comprise holes on one tubing section corresponding to the retracted and expanded positions and a button associated with the other tubing section for engaging one of the holes to hold the telescopic strut in the retracted or expanded position.

In another variation, the fixed strut may include first and second fixed strut members one end of each which is attached to the first support structure and the other end of each is engaged with one end of the first wheel axle.

The convertible cart may further comprise a second support structure, a second wheel having an axle, a second wheel retraction assembly operatively associated with the second support structure, and including a fixed strut for mounting one end of the second wheel axle to the second support structure and a telescopic strut connecting the opposite end of the second wheel axle to the second support structure, with the telescopic strut movable between retracted and expanded positions, wherein the retracted position maintains the first wheel in a position to enable the cart to be moved upon the first wheel and the expanded position moves the first wheel to another position adjacent the first support structure wherein the wheel is not supporting the cart. The second support structure is attached or connected to the first support structure typically by structural members, a separate basket or a plate member attached to the first support structure so that the second support structure can assist in supporting cargo to be transported by the cart. The first and second support structures can be a unitary structure of structural members, plates or the like.

In another variation, the telescopic strut of the second wheel retraction assembly may include first and second rectangular or square tubing sections in sliding engagement. In this variation, the convertible cart may further comprise a quick release connector for maintaining the telescopic strut of the second wheel retraction assembly in the retracted or expanded position. The quick release connector comprises holes on one tubing section of the telescopic strut of the second wheel retraction assembly corresponding to the retracted or expanded positions and a button associated with the other tubing section of the telescopic strut of the second wheel retraction assembly for engaging one of the holes to hold the telescopic strut of the second wheel retraction assembly in the retracted or expanded positions.

In another variation, the fixed strut of the second wheel retraction assembly may include first and second fixed strut members one end of each which is attached to the second support structure and the other end of each is engaged with one end of the second wheel axle.

In another embodiment, the convertible cart for transport of cargo comprises a first support structure, a first wheel having an axle, a first wheel retraction assembly operatively associated with the support structure, and including a fixed strut for mounting one end of the first wheel axle to the support structure and a telescopic strut connecting the opposite end of the first wheel axle to the support structure, with the telescopic strut movable between retracted and expanded positions, wherein the retracted position maintains the first wheel in a position to enable the cart to be moved upon the first wheel and the expanded position moves the first wheel to another position to be adjacent the support structure wherein the cart does not support the cart, a first connection mechanism connecting the telescopic strut to the first support structure, the first connection mechanism including a bracket, the bracket has an opening facing toward the first wheel in the expanded position, and an additional first connection mechanism connecting the fixed strut to the first support structure, the additional connection mechanism including an additional bracket, the additional bracket has an additional opening facing toward the first wheel in the retracted position.

In one variation of the preceding embodiment, the facing directions of the opening and additional opening are perpendicular. The facing directions of the additional openings are also perpendicular to the fixed strut in the expanded position. The facing direction of the opening is likewise perpendicular to the telescopic strut in the retracted position.

In another variation of the above form, the convertible cart may further comprise a second connection mechanism connecting the telescopic strut to the one end of the first wheel axle, the second connection mechanism including a screw and a pin. The convertible cart may further comprise another connection mechanism connecting the fixed strut to the opposite end of the first wheel axle, this connection mechanism including a trapezoid-shaped housing, a screw, and a nut.

BRIEF DESCRIPTION OF THE DRAWINGS

For the purposes of illustrating certain embodiments of the present invention, the following drawings are provided in which.

DETAILED DESCRIPTION OF THE INVENTION

Figure 1:
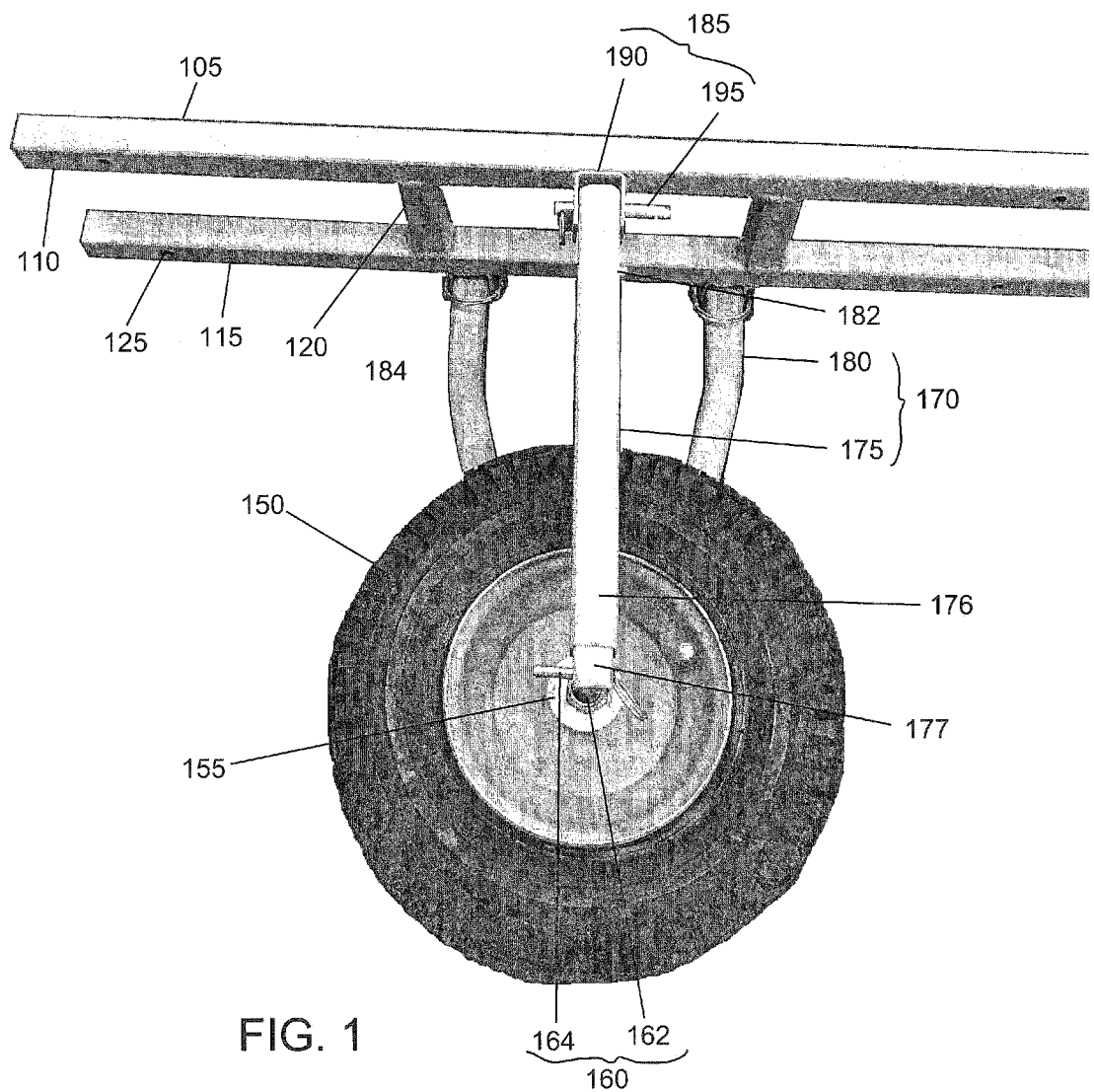
FIG. 1 is a side view of a first embodiment of the present invention.

Certain embodiments of the present invention now will be described more fully hereinafter with reference to the accompanying drawings. Referring to FIG. 1, a side view of one embodiment of the present invention is illustrated. In FIG. 1, the embodiment comprises a first support structure 105, a first wheel 150 having an axle 155, and a first wheel retraction assembly 170 including a telescopic strut 175 and a fixed strut 180. The first wheel retraction assembly 170 is operatively associated with the first support structure 105 so that the first wheel retraction assembly 170 is movable between retracted and expanded positions. The telescopic strut 175 mounts one end of the first wheel axle 155 to the first support structure 105 and the fixed strut 180 mounts the opposite end of the one end of the first wheel axle 155 to the first support structure 105.

The telescopic strut 175 includes a first (larger) tubing section 176 and a second (smaller) tubing section 177 movable within the first (larger) tubing section 176. The first (larger) tubing section 176 and the second (smaller) tubing section 177 may have a sliding engagement to achieve this movement. If desired, an alternative embodiment would have the first tubing smaller and the second tubing larger. Both tubing sections 176, 177 may be rectangular, square, circular, other shapes, or a combination thereof. Preferably, both tubing sections 176, 177 are either rectangular or square.

When both tubing sections 176, 177 are either rectangular or square, the first (larger) tubing section 176 may have at least three holes on one side with one hole that allows locking the telescopic strut 175 to the first support structure 105 and with the other two holes that allow moving the telescopic strut 175 or the first wheel retraction assembly 170 between retracted and expanded positions (one hole corresponds to the retracted position and another hole corresponding to the expanded position). A pin or button 182 is installed on or associated with the first (larger) tubing section 177 that can protrude from the other two holes and above the one side of the first (larger) tubing section 176.

In the retracted position, such as in FIG. 1, the button 182 protrudes from one of the other two holes to prevent the second (smaller) tubing section 177 from moving away from the first (larger) tubing section 176. When the button 182 is depressed below the side with the three holes, the second (smaller) tubing section 177 moves away from the first (larger) tubing section 176 to the expanded position in which the button 182 protrudes from another hole of the other two holes above the side to prevent the second (smaller) tubing section 177 from moving toward to the first (larger) tubing section 176. As such, the button 182 serves as a convenient quick release connector for maintaining or holding the telescopic strut 175, or the first wheel retraction assembly 170, in either of the expanded or retracted positions.

The structure shown in FIG. 1 can be used to convert a plate, basket or other object into a wheelbarrow by attachment of the support structure. The attachment can be made by bolts or nails depending upon what the plate or basket is made of, with nails preferably used for attachment to wood and bolts used for attachment to metal. When used to assist in demolition, for example, the structure shown in FIG. 1 can be attached to a door to form a makeshift cart that acts like a wheelbarrow for movement of debris. If necessary, a handle, rod or pair of rods can be attached to the door to assist in its movement.

Figure 2:
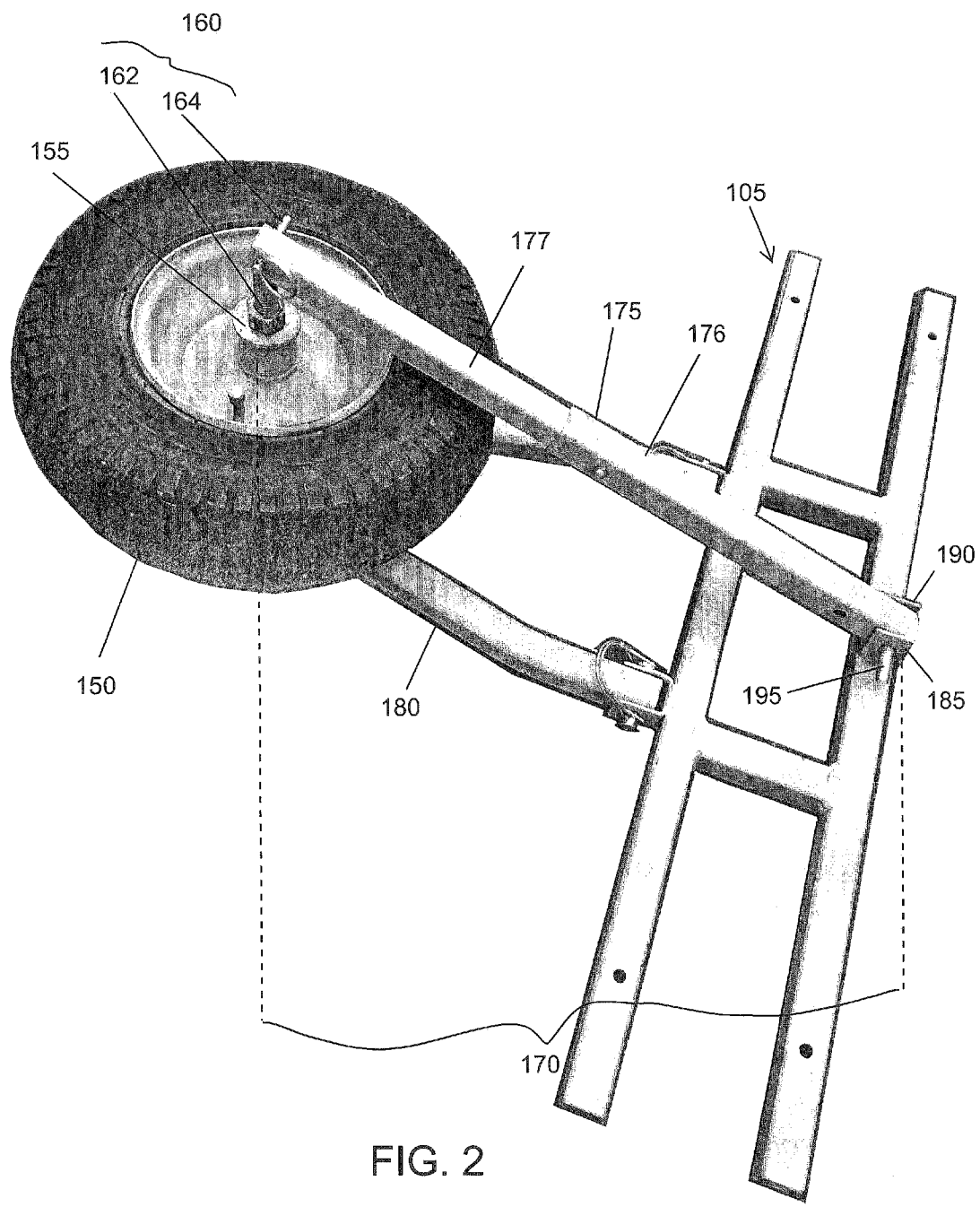
FIG. 2 shows a first wheel retraction assembly or a telescopic strut in the expanded position.

FIG. 2 is an illustration of the first wheel retraction assembly 170 with the telescopic strut 175 in the expanded position. The length of the telescopic strut 175 is longer when it is in the expanded position. The first (larger) tubing section 176 may have additional holes depending on the movement of the first wheel retraction assembly 170 and the structure of first connection mechanism 185.

The telescopic strut 175, or in particular, the first (larger) tubing section 176 of the telescopic strut 175, may be connected perpendicularly to the first support structure 105 via a first connection mechanism 185 that includes an U-shaped bracket 190 and a pin 195. The U-shaped bracket 190 has an opening facing toward the first wheel 150 in the retracted position that allows the telescopic strut 176 to be inserted. The U-shaped bracket 190 and the telescopic strut 176 both have holes that permit the pin 195 to be inserted, parallelly with respect to the first support structure 105, through the U-shaped bracket 190 and the telescopic strut 176 when these holes are aligned to lock the telescopic strut 176 in place. One of the holes of the telescopic strut 176 is the one hole mentioned above that provides the locking feature.

The telescopic strut 175, or in particular, the second (smaller) tubing section 177 of the telescopic strut 175, may be connected to the axle 155 via a second connection mechanism 160 that includes a screw 162 and a pin 164. The second (smaller) tubing section 177 is connected perpendicularly to one end of the screw 162, and the other end of the screw 162 is connected to the axle 155. Both the second (smaller) tubing section 177 and the screw 162 have holes that permit the pin 164 to be inserted, perpendicularly with respect to the telescopic strut 175 (and parallelly with respect to the first support structure 105), through the second (smaller) tubing section 177 and the screw 162 when these holes are aligned to lock the first wheel 150 to the second (smaller) tubing section 177 or to the first support structure 105. The screw 162 extends across the first wheel 150 and the other end of the screw 162 is connected to the fixed strut 180.

Although not completely visible in FIGS. 1 and 2, the second (smaller) tubing section 177 is configured such that the end that is maintained within the first (larger) tubing 176 abuts against pin 195 when the wheel is in the expanded position thus providing further support to the wheel during movement of the wheel when transporting the cart. The end may be configured with a recess that confirms to the outer diameter of the pin when engaged. Of course, sufficient room must be provided so that the second tubing section can be moved from the expanded position to the retracted position.

Figure 3:
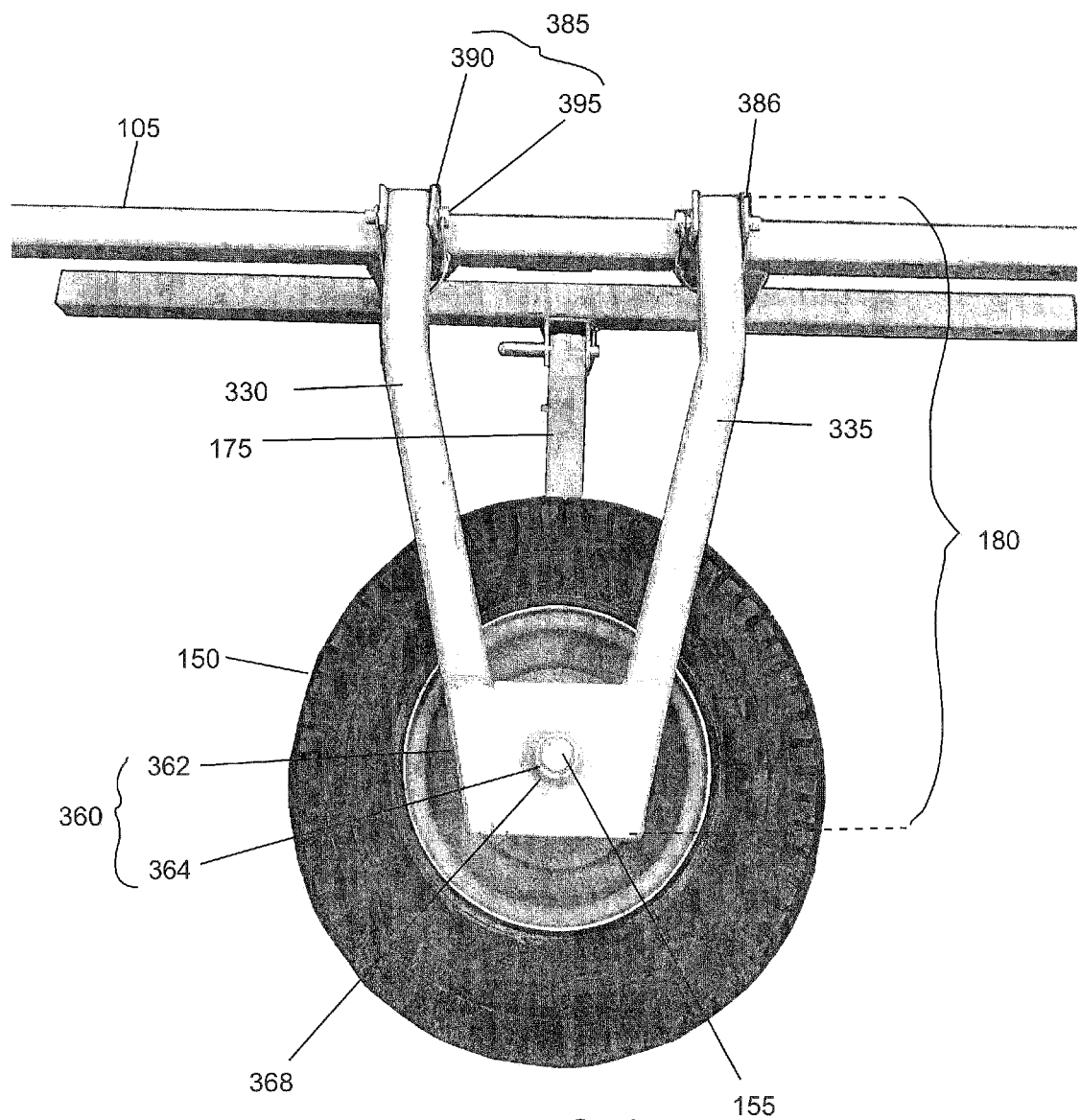
FIG. 3 is another side view of the first embodiment of the present invention.

FIG. 3 is another side view of the embodiment discussed above showing the fixed strut 180. Unlike the telescopic strut 175, the length of the fixed struts stays the same in both the retracted and expanded positions of the first wheel retraction assembly 170 or the telescopic strut 175. The fixed strut 180 may have one or more fixed strut members. In one embodiment, the fixed strut 180 has two fixed strut members 330, 335 as shown for additional support of the wheel and to provide further strength against bending moments when the wheel is moving and a load is being transported.

The two fixed strut members 330, 335 may be arranged to be parallel or non-parallel with respect to each other, such as using two parallel fixed strut members and placing them in a parallel or non-parallel manner. The two fixed strut members may also be non-parallel with respect to each other by using strut members that are manufactured, structured, or made to have a non-linear, bending, curving, or parabolic shape, such as 330, 335 shown in FIG. 3. When the two fixed strut members 330, 335 are not parallel with respect to each other, each strut member may form an acute angle with respect to the telescopic strut 175. In FIG. 3 the distance between the top portions (one end) of the two fixed strut members 330, 335 are wider than the distance between the bottom portions (the other end) of the two fixed strut members 330, 335.

The fixed strut 180 is connected to the first support structure 105 via a first connection mechanism 385 that includes an U-shaped bracket 390 and a pin 395. The U-shaped bracket 390 has an opening facing in a direction perpendicular to the two fixed strut members 330, 335 and to the opening of the U-shaped bracket of the telescopic strut 175. The U-shaped bracket 390 and the fixed strut 180 both have holes that permit the pin 395 to be inserted, parallelly with respect to the first support structure 105, through the U-shaped bracket 390 and the fixed strut 180 when these holes are aligned to lock the fixed strut 180 in place. A second connection mechanism 386, similar to connection mechanism 385, connects strut member 335 to support structure 105.

Figure 4:
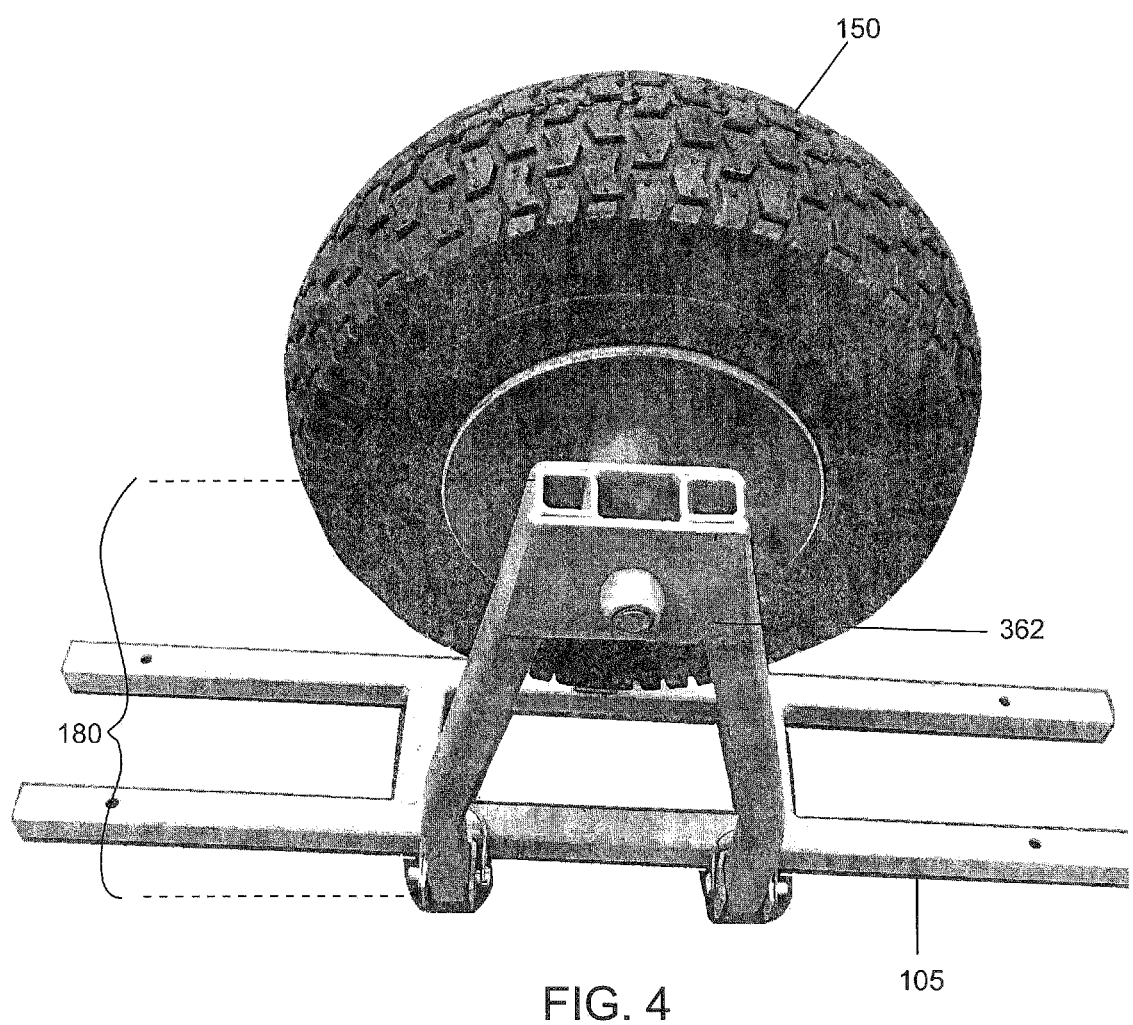
FIG. 4 is a bottom view of the first embodiment of the present invention.
Figure 5:
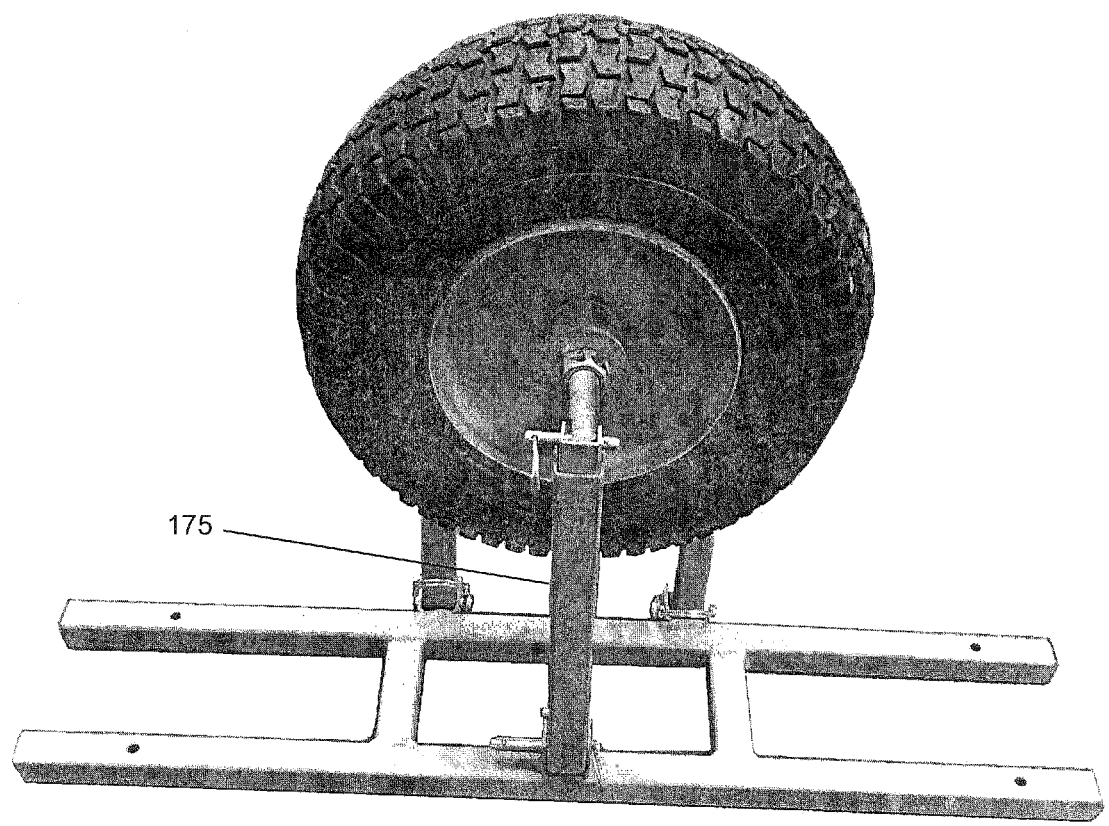
FIG. 5 is another bottom view of the first embodiment of the present invention.

The fixed strut 180 may be connected to the axle 155 via a second connection mechanism 360 that includes a housing 362, a screw 364, and a nut 368. The housing 362 may be part of the fixed strut 180 such that the housing 362 and the fixed strut 180 are of one single piece of the device. The housing 362 may also be a part separated from the fixed strut that is subsequently used to connect the fixed strut 180 to the first wheel 150. The housing 362 may have an interior space wide enough to accommodate the fixed strut 180. The screw 364 is inserted into the housing 362 in a direction perpendicular to the housing 362 and to the fixed strut 180. When the fixed strut 180 includes two fixed strut members, the bottom portions (the other end) of the two fixed strut members are connected to the axle 155 via the housing 362 without the bottom portions of the two fixed strut members physically touching each other. The screw 364 inserts across the housing 362 and the space between the bottom portions of the two fixed strut members. This is illustrated in FIG. 4, which is a bottom view of the fixed strut 180. FIG. 5 is a bottom view of the telescopic strut 175.

Referring to FIGS. 3 and 4, the housing 362 has a structure or shape to accommodate the bottom portions of the two fixed strut members 330, 335. In one embodiment, the housing 362 is trapezoid-shaped in the cross-sectional view. The trapezoid-shaped housing 362 is installed or connects the fixed strut 180 to the first wheel 150 in a manner that the longer side of the parallel sides of the housing 362 is closer to the first support structure 105 and that the shorter side of the parallel sides of the housing 362 is further from the first support structure 105. Moreover, after the installation, the tips of the bottom portions of the two fixed strut members 330, 335 align with the shorter side of the parallel sides of the housing 362 without protruding out from the shorter side and the sides of the bottom portions of the two fixed strut members 330, 335 align with the non-parallel sides of the housing 362 without protruding out from the non-parallel sides.

Referring back to FIG. 1, additional details of the first support structure 105 will now be discussed. The first support structure 105 may include a plurality of parallel beams 110, 115 and a plurality of traverse bars 120. The beams and bars may be rectangular, square, circular, other shapes, or a combination thereof. In certain embodiments, both the beams 110, 115 and bars 120 are either rectangular or square. In another embodiment, both the beams 110, 115 and bars 120 have the same shape as the tubing sections 176, 177. The first support structure 105, or the beams 110 and bars 115 together, may be one single piece of the device as shown in FIG. 1. The beams 110 and bars 115 may also be four separate components that are subsequently connected to produce the first support structure 105. The beams and bars may also have one or more holes 125 for connecting to additional support structures or to a vehicle. Although FIG. 1 shows a support structure with only two parallel beams and two traverse bars, it may have additional beams and bars to lengthen and/or widen the support structure.

In one embodiment, the telescopic strut 175 is connected to one of the plurality of parallel beams, such as 110, and the fixed strut 180 is connected to another one of the plurality of parallel beams, such as 115. In particular, the telescopic strut 175 is connected to one of the plurality of parallel beams via a first connection mechanism 185 that includes a U-shaped bracket 190 and a pin 195. The fixed strut 180 is connected to another one of the plurality of parallel beams via additional connection mechanisms 385, 386 (see FIG. 3) that include a U-shaped bracket and a pin. The U-shaped bracket 190 of the first connection mechanism 185 is attached to a surface of the one of the plurality of parallel beams, the U-shaped brackets of the additional connection mechanisms are attached to a surface of the another one of the plurality of parallel beams that is perpendicular to the surface of the one of the plurality of parallel beams.

Referring to FIGS. 2-5, those figures also show that the first connection mechanisms 384, 386 facilitate the first wheel retraction assembly 170 moving between retracted and expanded positions. FIG. 2 shows the first wheel retraction assembly 170 in the expanded position whereas FIGS. 4 and 5 show the first wheel retraction assembly in the retracted position. The U-shaped brackets of the connection mechanisms are attached to the first support structure 105 and oriented in a manner that the top portions of the telescopic strut 175 and fixed strut 180 can move within the U-shaped brackets and that the first wheel retraction assembly 170 can move between retracted and expanded positions. In the retracted position, the first wheel and the first wheel retraction assembly are directly beneath and perpendicular to the first support structure (based on FIGS. 1 and 3) and the telescopic strut does not extend away from the support structure.

Also, in the retracted position, the first wheel retraction assembly also maintains the first wheel in a position to enable the cart to be moved upon the first wheel. In the expanded position, the telescopic strut extends away from the first support structure to move the first wheel retraction assembly in the direction the opening of the U-shaped bracket of the fixed strut is facing. Also in the expanded position, the first wheel retraction assembly and the first wheel are moved to be adjacent or closer to the first support structure and a basket or plate member attached to the first support structure for carrying cargo. In one embodiment, the first wheel may be adjacent to the first support structure because the first wheel is closer to the surface to which the first support structure attached or because the first wheel is next to the first support structure in the horizontal direction of the cart. In another embodiment, the first wheel may be adjacent to the first support structure because the dimension of the first support structure in the horizontal direction is larger and moving the first wheel to the expanded position would make the first wheel closer to the first support structure in the horizontal direction of the cart compared to the first wheel in the vertical direction of the cart (or the retracted position). The basket or plate member is shown in FIGS. 6-10.

As shown in those FIGS. 6-10, two wheel structures are attached to a metal cargo basket. These can be positioned such that the cargo basket has a wider dimension that is perpendicular to the orientation of the wheels and direction of travel, but the opposite can also be possible, with the wider dimension being parallel to the orientation of the wheels and direction of travel. Also, while FIGS. 6-10 show the use of two wheel structures, it is also possible to utilize four wheel structures so that the cart is self-standing and does not need to be held upright by persons grasping the attachment member or the front and sides of the cart.

Figure 6:
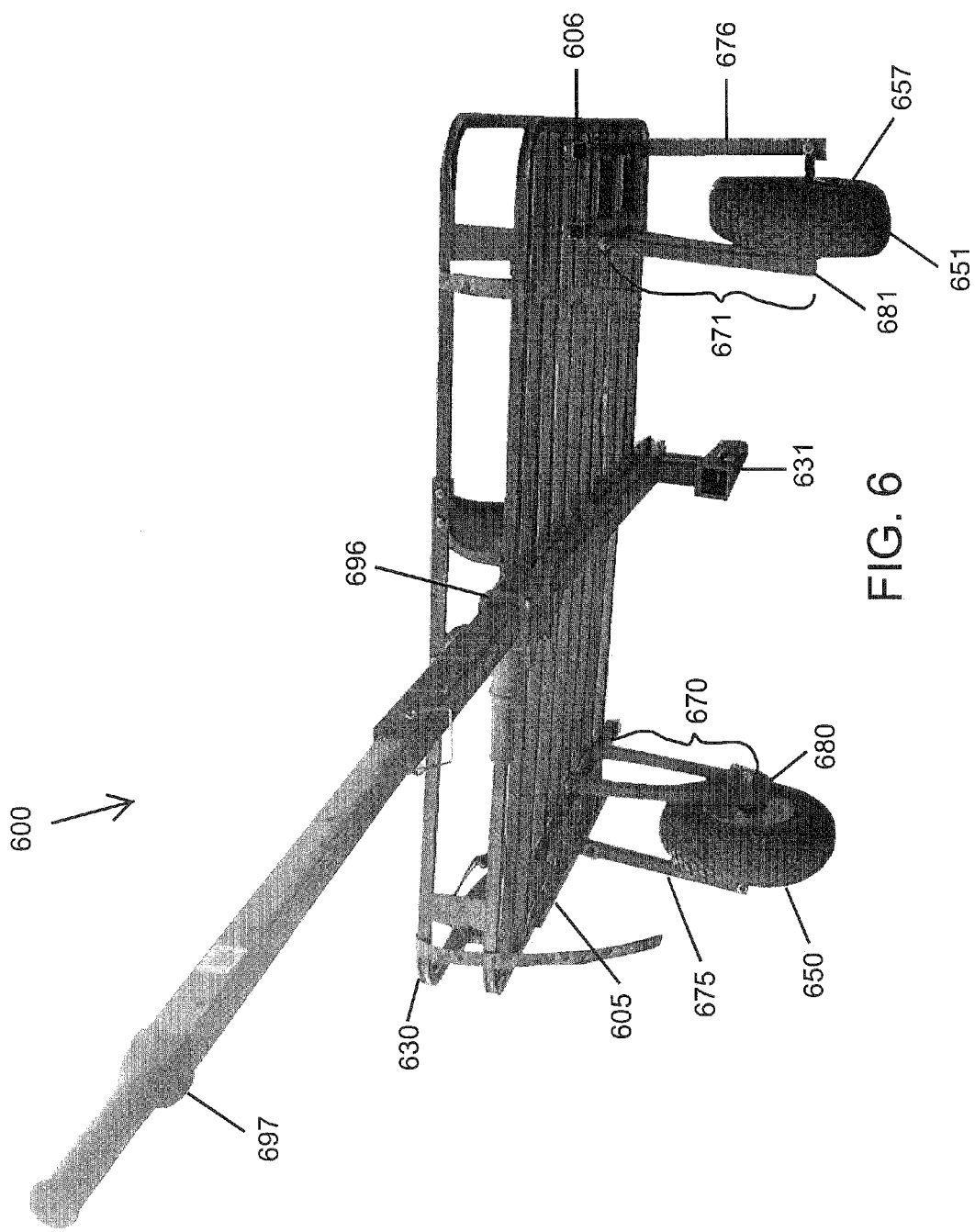
FIG. 6 shows a second embodiment of the present invention.

FIG. 6 shows an embodiment of a convertible cart 600 for the transport of cargo comprising a first support structure 605, a first wheel 650 having an axle, a first wheel retraction assembly 670 including a telescopic strut 675 and a fixed strut 680, a second support structure 606, a second wheel 651 having an axle, and a second wheel retraction assembly 671 including a telescopic strut 676 and a fixed strut 681. The first wheel retraction assembly 670 is operatively associated with the first support structure 605 so that the first wheel retraction assembly 670 is movable between retracted and expanded positions. The second wheel retraction assembly 671 is also operatively associated with the second support structure 606 so that the second wheel retraction assembly 671 is movable between retracted and expanded positions. The telescopic strut 675 mounts one end of the first wheel axle to the first support structure 605 and the fixed strut 680 mounts the opposite end of the one end of the first wheel axle to the first support structure 605. The telescopic strut 676 mounts one end of the second wheel axle to the second support structure 606 and the fixed strut 681 mounts the opposite end of the one end of the second wheel axle to the second support structure 606.

The convertible cart 600 may also comprise a basket or plate member 630 attached to the support structures 605 and 606 for carrying cargo. On one end of the convertible cart 600, the convertible cart 600 may further comprise a connection attachment member 631 configured and dimensioned for attachment to a trailer hitch of a vehicle for transport of the convertible cart 600. On the other end of the convertible cart 600 opposite to the one end, the convertible cart 600 may further comprise a receiver 696 protruding from the basket 630 in a direction away from the one end. The receiver 696 is preferably 2 inches long, but other lengths are also contemplated by the invention depending on the size, design, and structure of the convertible cart 600.

Figure 7:
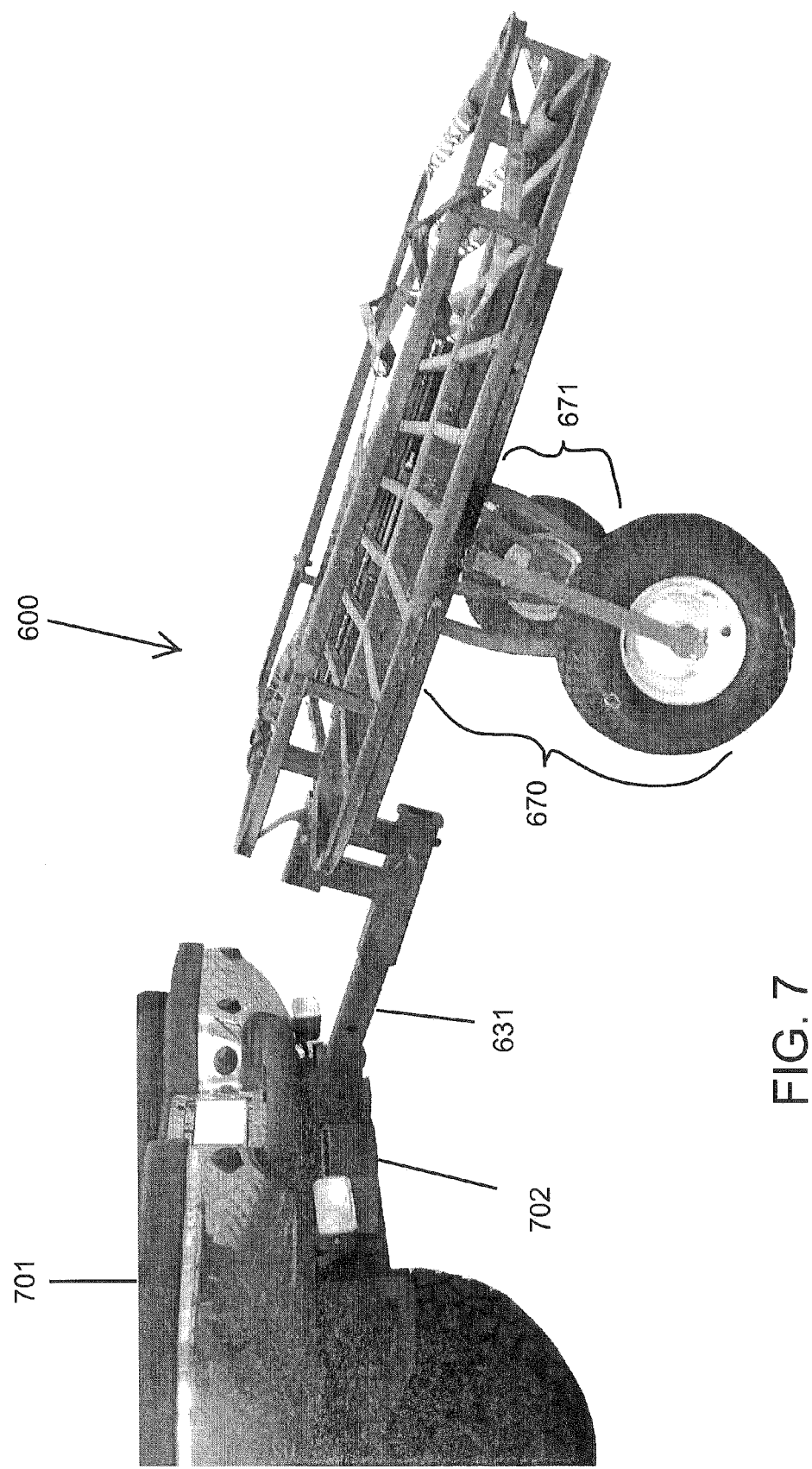
FIG. 7 shows the second embodiment attached to a trailer hitch of a vehicle.
Figure 8:
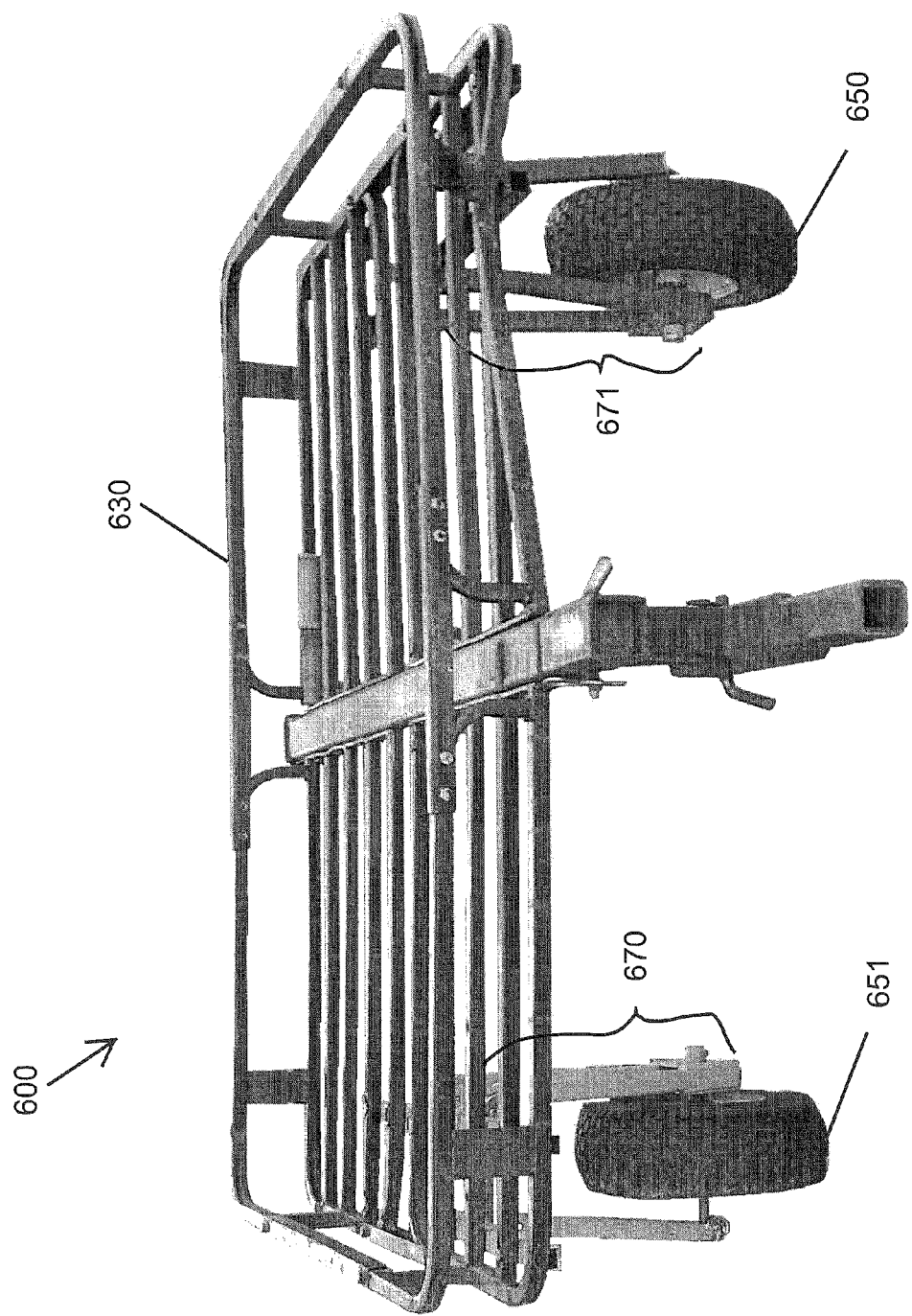
FIG. 8 depicts the second embodiment with the wheel retraction assemblies in the retracted position.

A handle 697 may be inserted into the receiver 696, and be employed to facilitate detachment of the basket 630, along with the wheel retraction assemblies, from a vehicle (FIG. 6) and attachment of the basket 630, along with the wheel retraction assemblies, to the vehicle (FIGS. 7 and 8). For detachment, the handle 697 may be pulled in a direction away from the vehicle to disconnect the basket 630 from the vehicle and be utilized to push the basket 630 to a desired location after the disconnection (FIG. 6). For attachment, the handle 697 may be employed to push the connection attachment member 631 into a trailer hitch of the vehicle and to lift the basket 630 above the ground after the connection attachment member 631 is being pushed into the trailer hitch (FIGS. 7 and 8)

FIG. 7 shows the convertible cart 600 of FIG. 6 with attachment member 631 attached to a trailer hitch 702 of a vehicle 701 before the convertible cart 600 is lifted above the ground. Both FIGS. 6 and 7 show the wheel retraction assemblies, or the telescopic struts of the wheel retraction assemblies, in the retracted positions. The wheels facilitate the loading of heavy items onto the vehicle and the unloading of heavy items from the vehicle. For example, the convertible cart may be moved to one location where the heavy items would be loaded onto the basket and then be moved to and connected to the vehicle after the heavy items are loaded. Once the vehicle reaches its destination, the convertible cart can be disengaged from the vehicle and be moved to another location where the heavy items may be unloaded from the basket. The convertible cart may also stay attached to the vehicle without being disconnected, and individuals may bring items to the cart or remove items from the cart when the items are light or can be easily carried. Heavy and light items may include party rentals (such as tents, chairs, tables, and kiddie air castles), different tools (such as camping, fishing, and hunting tools), mails, mechanical parts of a vehicle, machines, scrap metals, appliances, animal carcasses and any other items suitable for placement on the basket. The size of the wheels may be adjusted depending on if the wheels would be utilized to move along with the vehicle on the ground and the speed the vehicle would be traveling if the wheels are used to move along with the vehicle on the ground. The size of the wheels may be smaller if the convertible cart would not be utilized to roll on the road along with the vehicle (such as the convertible cart disclosed in FIGS. 8-10 which are lifted above the ground or when the convertible cart is fully attached to the vehicle) when the vehicle is in motion and is only utilized to move items between places when the convertible cart is detached from the vehicle. The size of the wheels may also be smaller if the convertible cart would be utilized to roll on the road along with the vehicle and the vehicle would be traveling at slow speed. The size of the wheels may be larger if the convertible cart would be utilized to roll on the road with the vehicle and the vehicle would be traveling at high speed.

To attach the cart to a vehicle that has a standard hitch, the cart 600 is moved adjacent the vehicle with the rear end of the cart angled downwards and the attachment member 631 on the front of the cart angled upwards toward the hitch. As the attachment member 631 engages the hitch, the rear end of the cart 600 is lifted, either by people or from a jack positioned beneath the cart or from a lifting mechanism associated with the vehicle. The attachment member 631 is then slid into the hitch wherein it is locked in place in a conventional way by placing pins into holes in the hitch and attachment member. To assist in the alignment of the attachment member and the hitch, a collar (see FIG. 13) can be attached to the hitch or a small rod can be placed in the hitch to act as a stop for the attachment member wherein the stop also aligns the holes of the hitch and attachment member 631 to facilitate attachment with the pins. And while the hitch is sufficient to secure the cart to the vehicle, the cart 600 may include strap members attached to a rear part of the cart to provide additional stability of the cart to prevent wobbling and rocking of the cart and its contents as it is driven on the road by the vehicle.

FIG. 8 depicts the convertible cart 600 with the wheel retraction assemblies in the retracted position without showing the vehicle. In the retracted position, the wheels are further away from the basket 630 and the wheels are oriented perpendicular to the basket 630. In particular, the direction in which the wheels roll are perpendicular to the basket 630, or to the width of the basket 630 between the wheels 650, 651 or wheel retraction assemblies. After depressing the pin, the wheel can be easily lifted in position by the user's had or foot whereas it locks in place as it assumes the horizontal position. FIG. 8 is also an illustration showing the convertible cart disconnected from a vehicle.

Figure 9A:
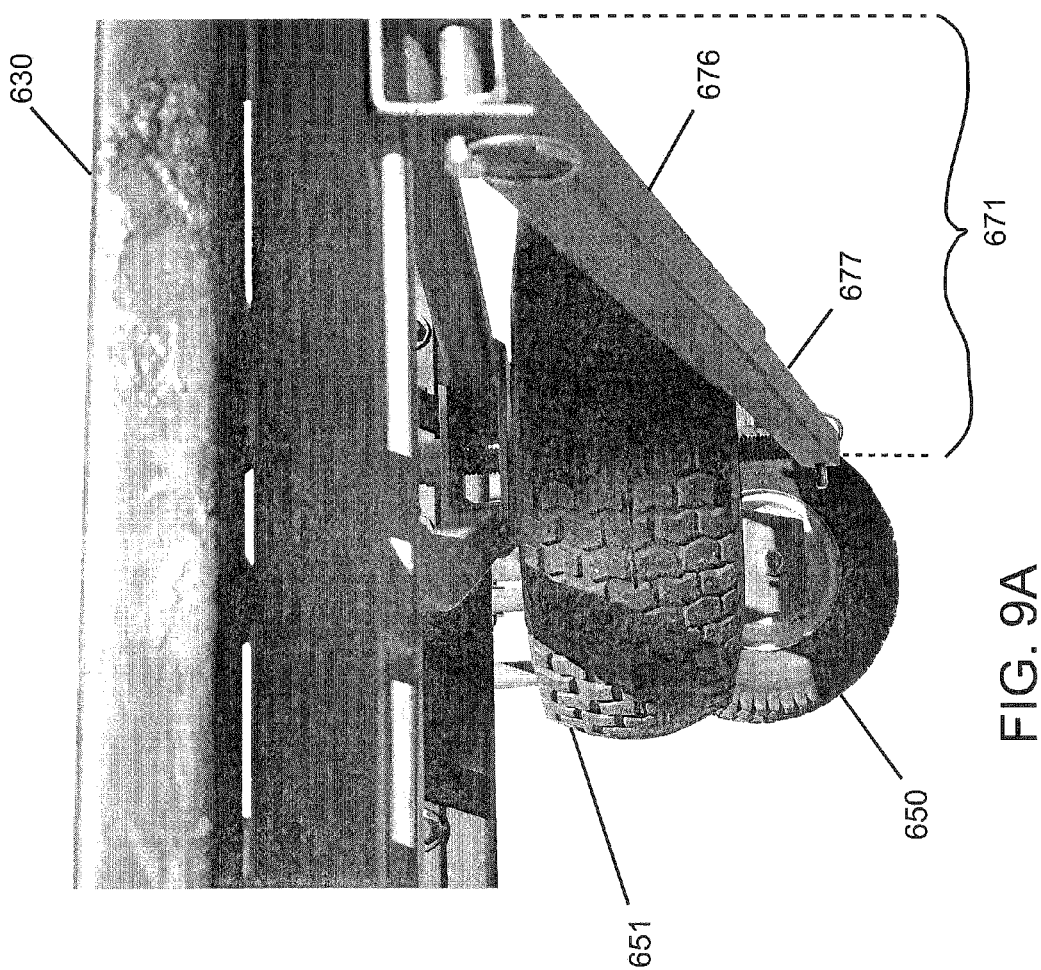
FIGS. 9A-9B depict the second embodiment with one of the wheel retraction assemblies in the expanded position and the other one of the wheel retraction assemblies in the retracted position.
Figure 9B:
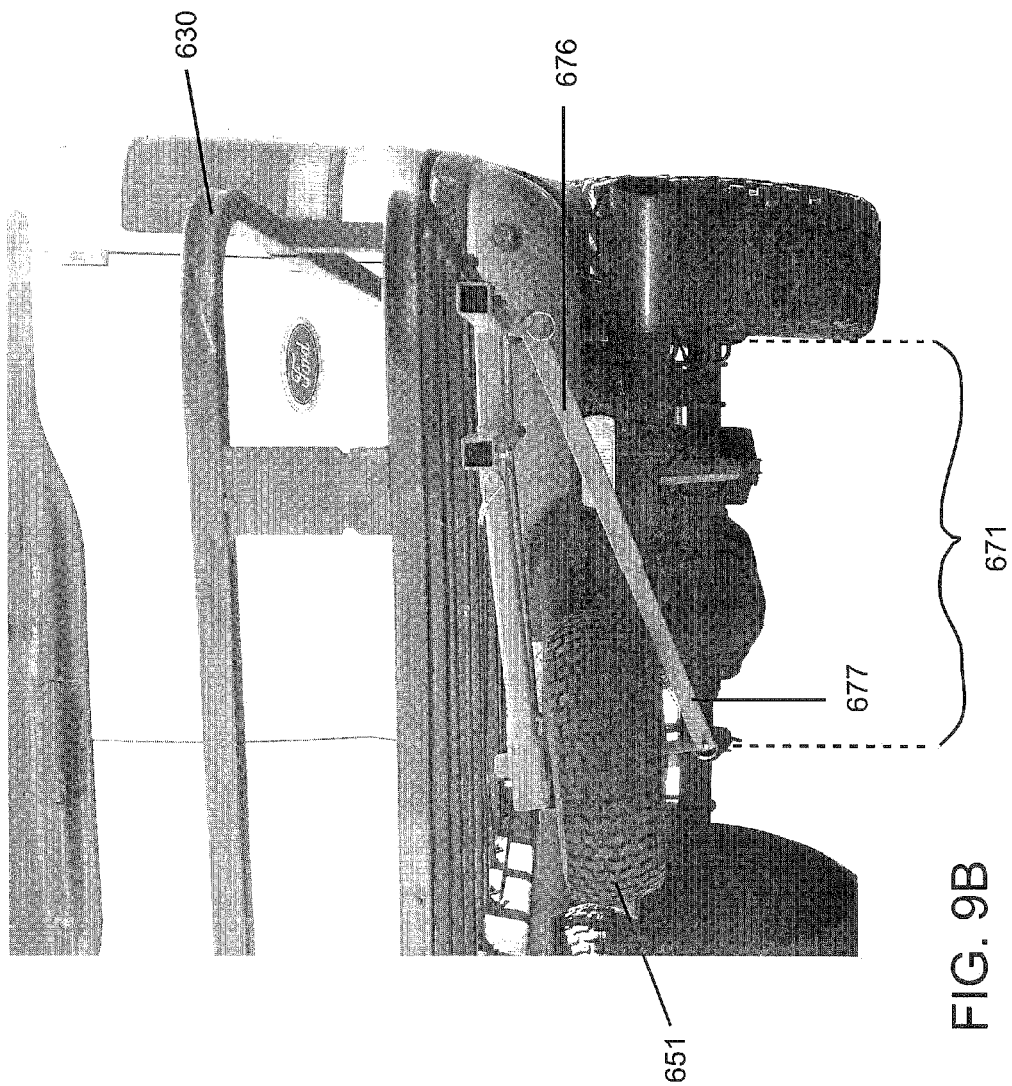
Figure 10:
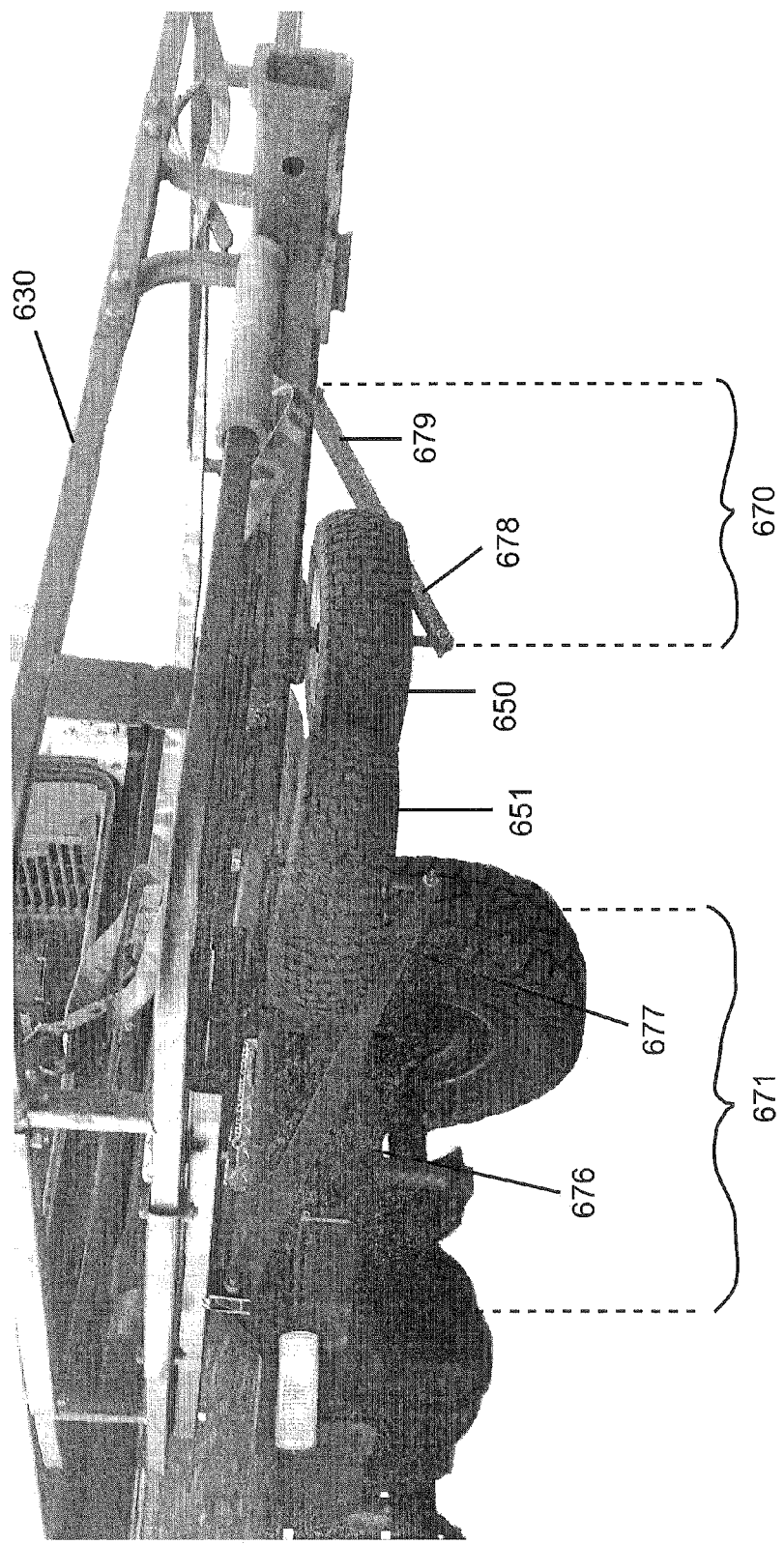
FIG. 10 depicts the second embodiment with both wheel retraction assemblies in the expanded position.

FIGS. 9A-9B illustrate when one of the wheel retraction assemblies is in the expanded position and the other one of the wheel retraction assemblies is in the retracted position and FIG. 10 illustrates when both wheel retraction assemblies are in the expanded position. In the expanded position of these three figures, each wheel is closer or adjacent to the basket 630 and is oriented substantially parallel to the underside of the basket 630. In particular, the expanded position allows the cart to be attached to the vehicle without the wheels touching the ground so that movement of the cargo can be made anywhere the vehicle can travel without regard to the condition of the road or the ability of a trailer to move along the road. This enabled the cart to be carried off road e.g., for camping. When the campsite is reached, the struts can be retracted so that the wheels can be used to help move the cargo mounted on the cart, in effect transforming the cart to a wheelbarrow that often can be moved by one or two people depending upon the load.

The final position of each wheel when its strut is in the expanded position is substantially parallel to the underside of the basket. Also in the expanded position of both figures, the second (smaller) tubing section 677 extends away from the first (larger) tubing section 676. From the retracted position to the expanded position, the wheel retraction assembly 671 moves the wheels 650, 651 from a position enabling the cart to be moved upon the wheels to another position folding the wheels 650, 651 to be closer or adjacent to the underside of the basket 630. In the another position, the wheels 650, 651 are also closer or adjacent to the support structures. In one embodiment, each wheel may be adjacent to its respective support structure because the wheel is closer to the surface to which the respective support structure is attached or because the wheel is next to the respective support structure in the horizontal direction of the cart. In another embodiment, each wheel may be adjacent to its respective support structure because the dimension of the respective support structure in the horizontal direction is larger and moving the wheel to the expanded position would make the wheel closer to the respective support structure in the horizontal direction of the cart compared to the wheel in the vertical direction of the cart (or the retracted position).

As noted above, FIG. 10 shows cart 630 attached to a vehicle with both wheels 650, 651 in the expanded position, away from the ground.

Figure 11:
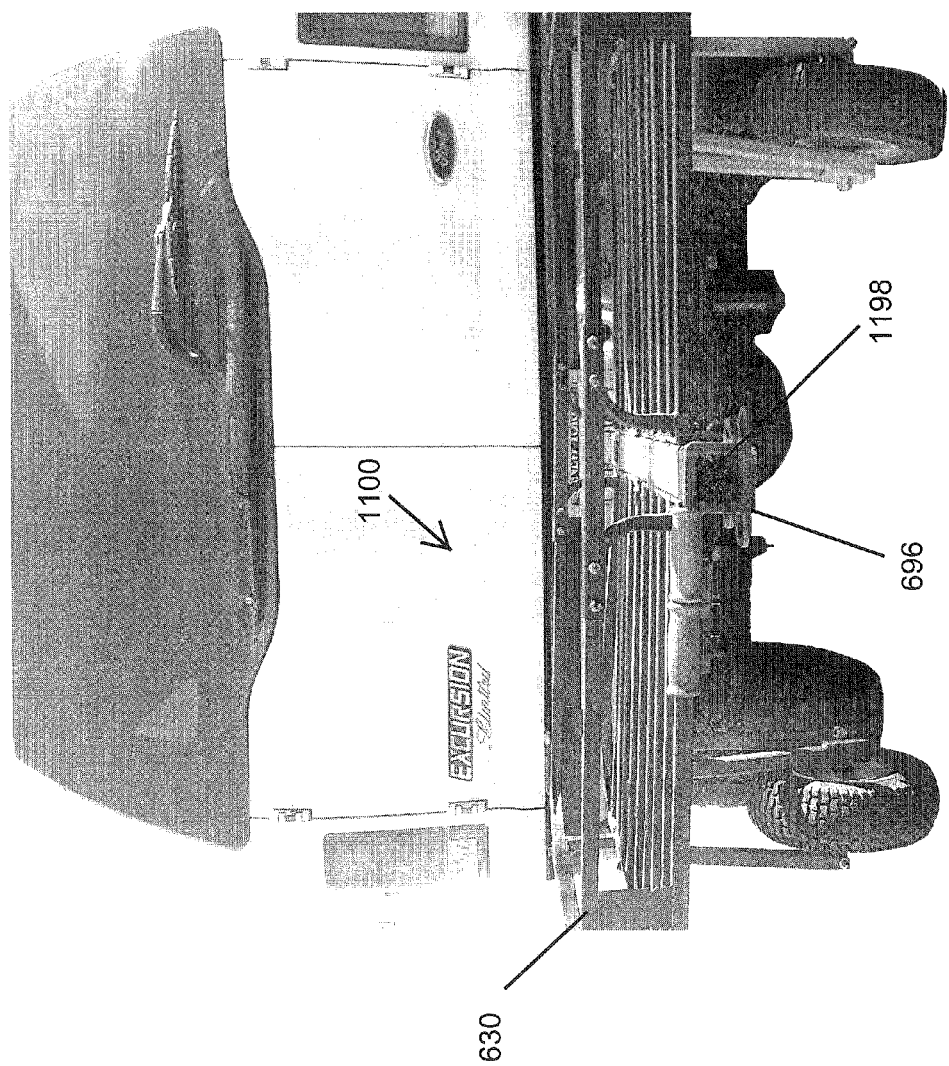
FIG. 11 depicts an illustrative receiver in accordance with some embodiments of the present invention.

FIG. 11 depicts an illustrative receiver 696 in accordance with some embodiments of the present invention. The receiver 696 may extend across the entire basket 630 in a direction parallel to the support structures of the wheel retraction assemblies and between the wheel retraction assemblies to connect with the connection attachment member. In another embodiment, the receiver 696 may extend only partially through the basket 630 and be connected to the connection attachment member via an intermediary component. The receiver 696 may be a tube with a shape that is rectangular, square, circular, other shapes, or a combination thereof. Preferably, the receiver 696 is rectangular. The receiver 696 may have a hollow interior 1198 to accommodate the handle. A handle may be inserted into the hollow interior 1198 and be employed to facilitate the attachment or detachment of the convertible cart 600 from a vehicle as discussed above. The hollow interior 1198 may have the same shape as the receiver 696 or different shape from the receiver 696 to accommodate the handle.

The receiver 696 and/or hollow interior 1198 may also allow attaching another basket or a tow bar. Attaching another basket or more baskets when the first basket is already connected to the vehicle and lifted above the ground allows additional cargo to be loaded onto the vehicle and cargo from different places to be transported to the vehicle simultaneously without having to wait for the first basket to become available if only one basket is employed. Attaching another basket while the first basket is disconnected from the vehicle may create a 4-wheel wagon that provides additional stability to the baskets while they are being pushed to roll on the ground. The 4-wheel wagon permits the baskets to be rolled parallelly with the ground without tilting. While one basket, or one convertible cart, with two wheels may also be pushed in a manner such that the basket is parallel to the ground, the additional basket, or the additional two wheels, makes this action much easier to perform when the cargo is heavy. Attaching a tow bar allows other trailers, such as cargo trailers and recreational trailers, and other vehicles, such as boats and motorcycles, to be hauled by the vehicle.

Figure 12:
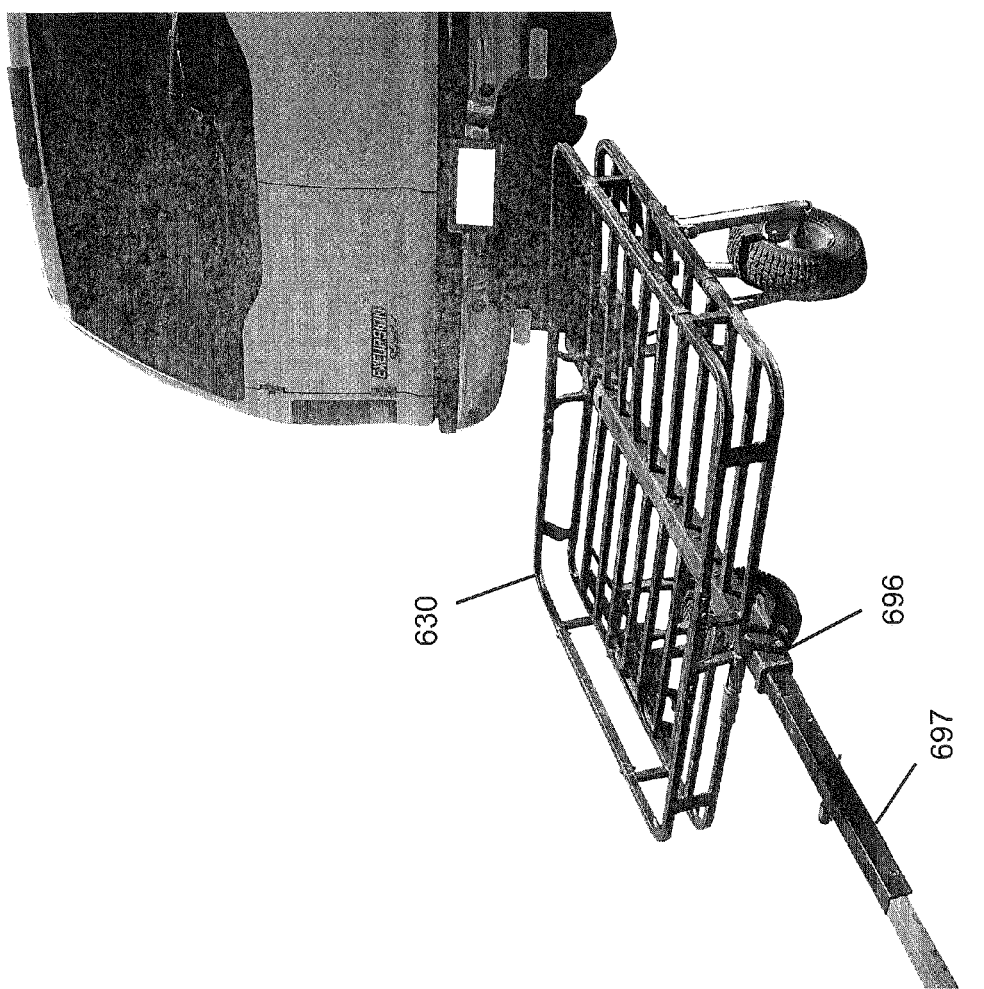
FIG. 12 also shows the second embodiment attached to a trailer hitch of a vehicle.

FIG. 12 shows the second embodiment attached to a trailer hitch of a vehicle. The handle 697 engages with the receiver 696, and a user of the convertible cart may pull the handle 697 in a direction away from the vehicle to disconnect the basket 630 from the vehicle or push the handle 697 in a direction toward the vehicle to attach the basket 630 to the vehicle.

While FIGS. 6-12 show only two sets of support structures, wheels, and wheel retraction assemblies, additional sets of wheels, and wheel retraction assemblies may be attached to the cart or basket if needed. The cart may also have only one set of support structures, wheels, and wheel retraction assemblies when the only one set of support structure, wheel, and wheel retraction assembly is configured and dimensioned for attachment to the cart or basket and for enabling the cart to be moved on the ground via the only one wheel. The cart may also have more than one connection attachment member if required. The cart itself may also include a hitch on the end opposite the attachment member. This would enable multiple carts to be connected in line either for movement by the ATV where the wheels contact the ground or while the carts are lifted off the ground. Of course, the hitched much be sufficiently strong to support the weight of the cart and its anticipated contents.

For any carts that have attachment members for engaging the hitch of a vehicle, the attachment member can be used as a handle for movement of the cart when not attached to the vehicle. Additionally, the hitch may be connected to a smaller vehicle (such as an ATV) for movement of the cart over rougher terrain that a car or truck is unable to traverse.

Alternatively, to assist in moving the carts when not attached to the vehicle, the wheels may be motorized as shown e.g., in U.S. Pat. No. 6,793,236.

To render the cart more flexible with regard to movement, the wheels can be mounted to the support structure in a way that allows the wheels to rotate about the mounting position, as shown e.g., in U.S. Pat. No. 7,284,299 which discloses a caster for a wheel structure. The caster would be mounted to the support structure in order to facilitate rotation of the wheel structure and its retraction/expansion mechanism.

Figure 13:
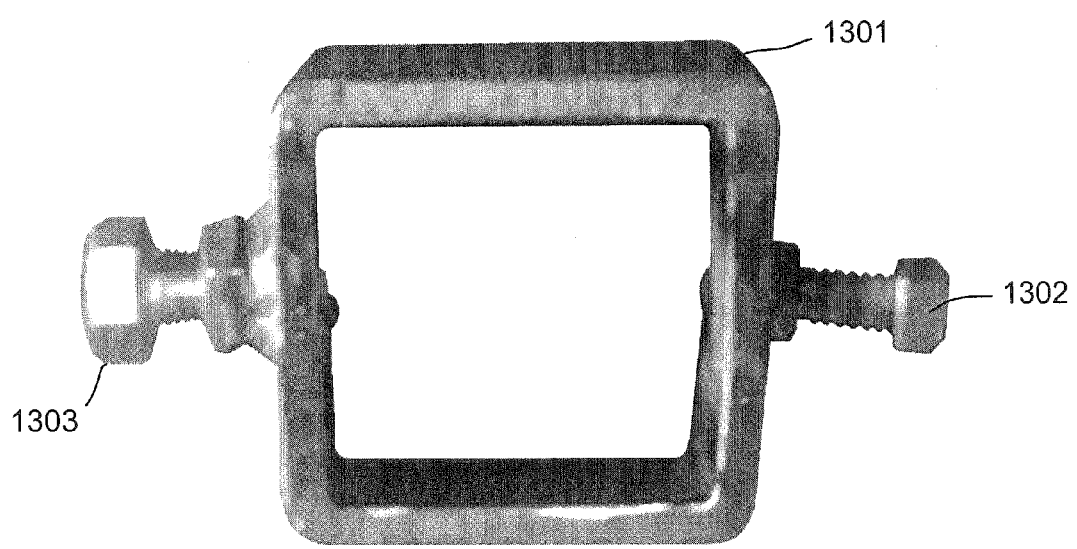
FIG. 13 depicts a locking mechanism that can be used with various embodiments to more easily couple a cart to a trailer hitch.
Figure 14:
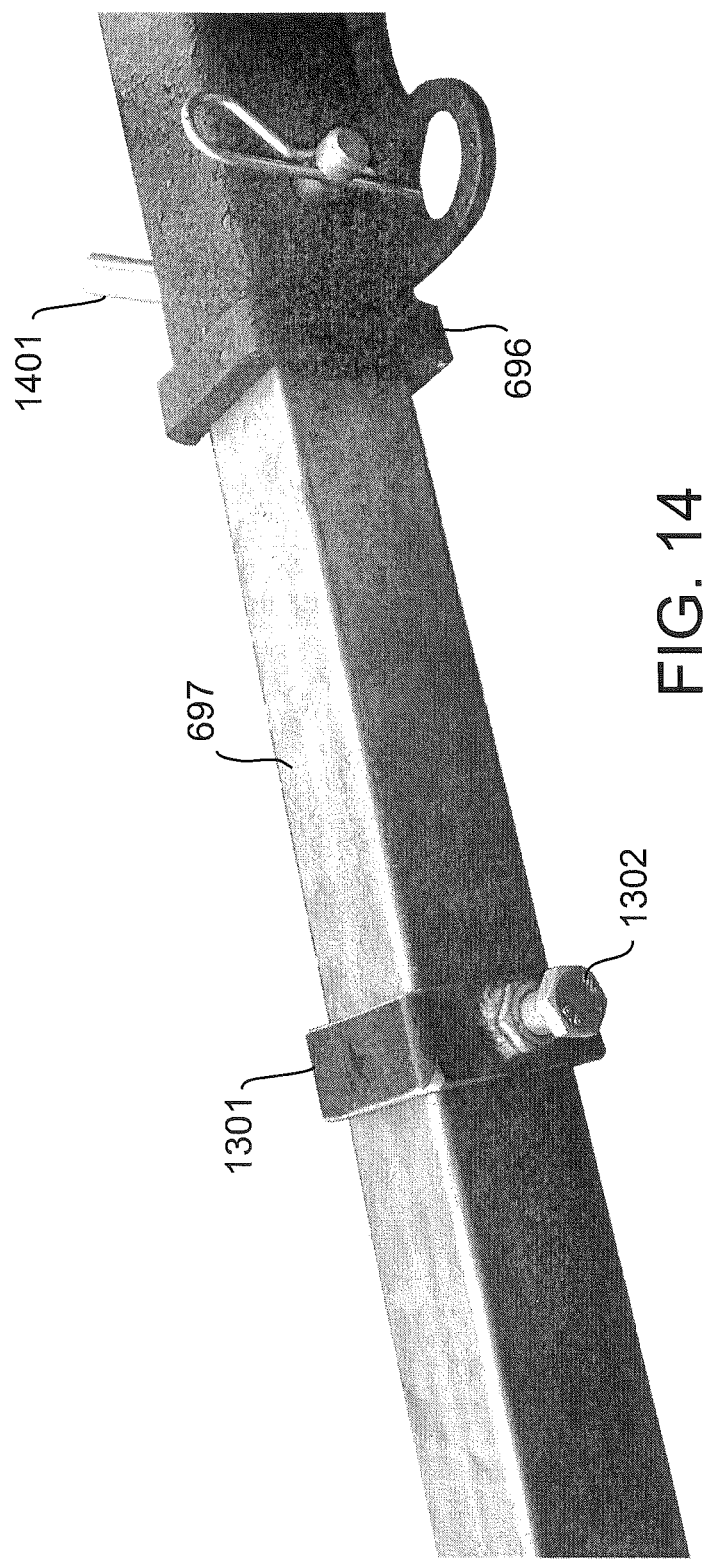
FIG. 14 shows the locking mechanism of FIG. 13 secured to the attachment member of a cart.
Figure 15:
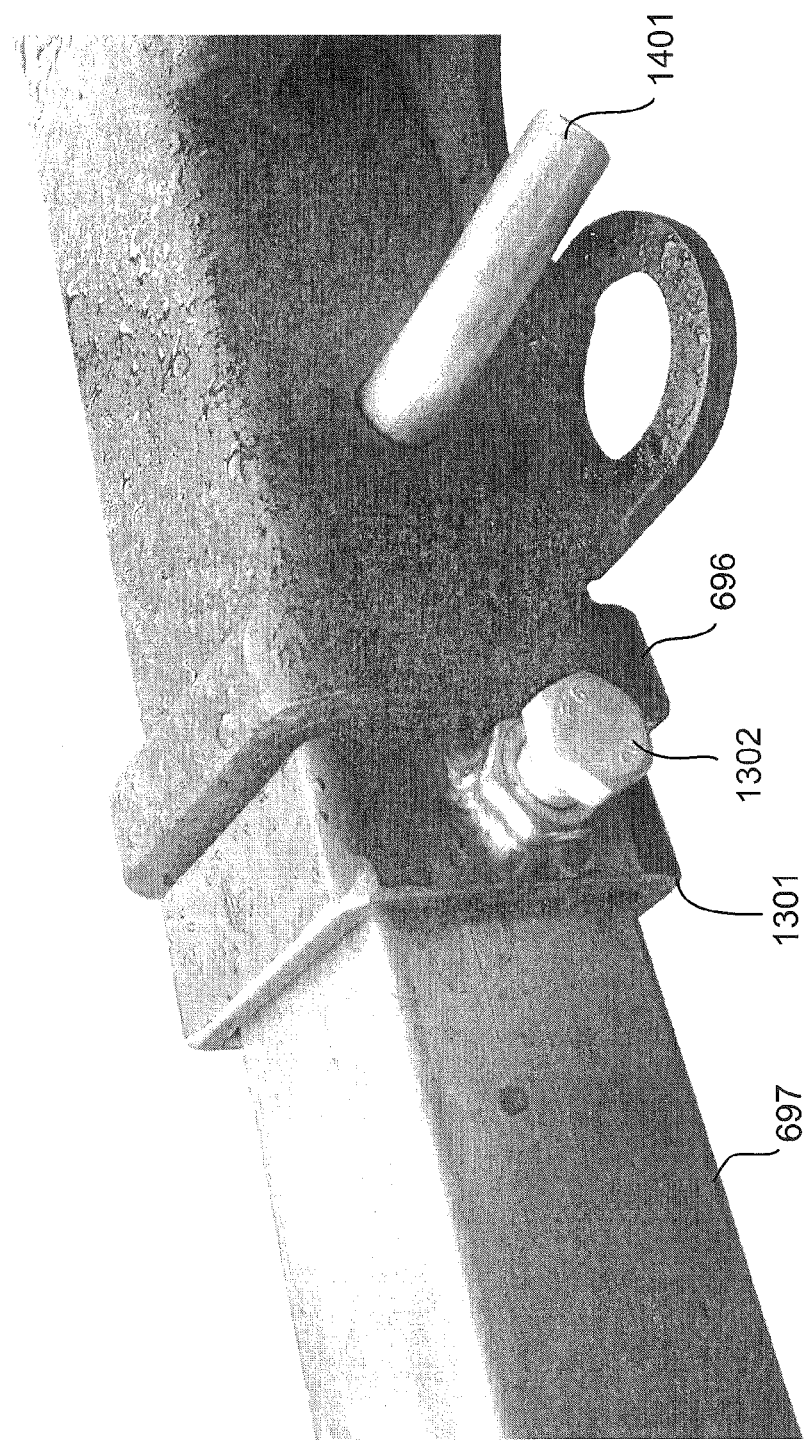
FIG. 15 shows the locking mechanism of FIGS. 13-14 placed in a position to be locked so as to facilitate further couplings between the attachment member and the trailer hitch.

FIG. 13 depicts a locking mechanism 1301 having a generally square body with opposed set bolts 1302, 1303, respectively. FIG. 14 shows locking mechanism 1301 used with handle 697 to facilitate quick placement and alignment of the handle 697 into the receiver 696, as explained below. In particular, locking mechanism 1301 fits around handle 697 and, when set bolts 1301, 1302 are loose, can be slid back and forth along handle 697. When the handle is first placed into the receiver 696, the user will have to carefully align a set of holes in handle 697 with corresponding holes in the receiver 696 to enable placement of a locking pin 1401. FIG. 14 shows handle 697 after such an alignment has been made and the pin 1401 has been placed into the aligned holes to secure handle 697 to receiver 696. After handle 697 is securely locked to the receiver 696 the locking mechanism 1301 is moved to the right until it is flush with the front edge of receiver 696, as shown in FIG. 15. Set bolts 1302 and 1303 (not shown in FIG. 15) are then tightened to fix the position of locking mechanism 1301 on handle 697.

Thereafter, each time handle 697 is removed from receiver 696 by first removing pin 1401, and is reinserted back into receiver 696, the locking mechanism 1301 will allow for quick and easy alignment of the holes in handle 697 and the holes in the receiver 696. Specifically, the handle 697 is simple pushed into receiver 696 until the locking mechanism 1301 meets the front edge of receiver 696, at which point the holes in handle 697 should be perfectly aligned with the holes in receiver 696, and pin 1401 can be quickly pushed into position securing handle 697.

Locking mechanism 1301 can similarly be used to more easily align any two items where one item slidably engages another. For example, a similar locking mechanism can be used to attach the cart to a towbar, such as shown in FIG. 11 and/or as discussed below in connection with FIGS. 20-22. It should also be noted that locking mechanism can have a variety of shapes, and need not fully surround the handle or whatever item is being aligned. For example, locking mechanism 1301 can have a "C" shape, surrounding only half of the handle. Such a "C" shape would allow for easier placement of the locking mechanism on the handle.

Figure 16:
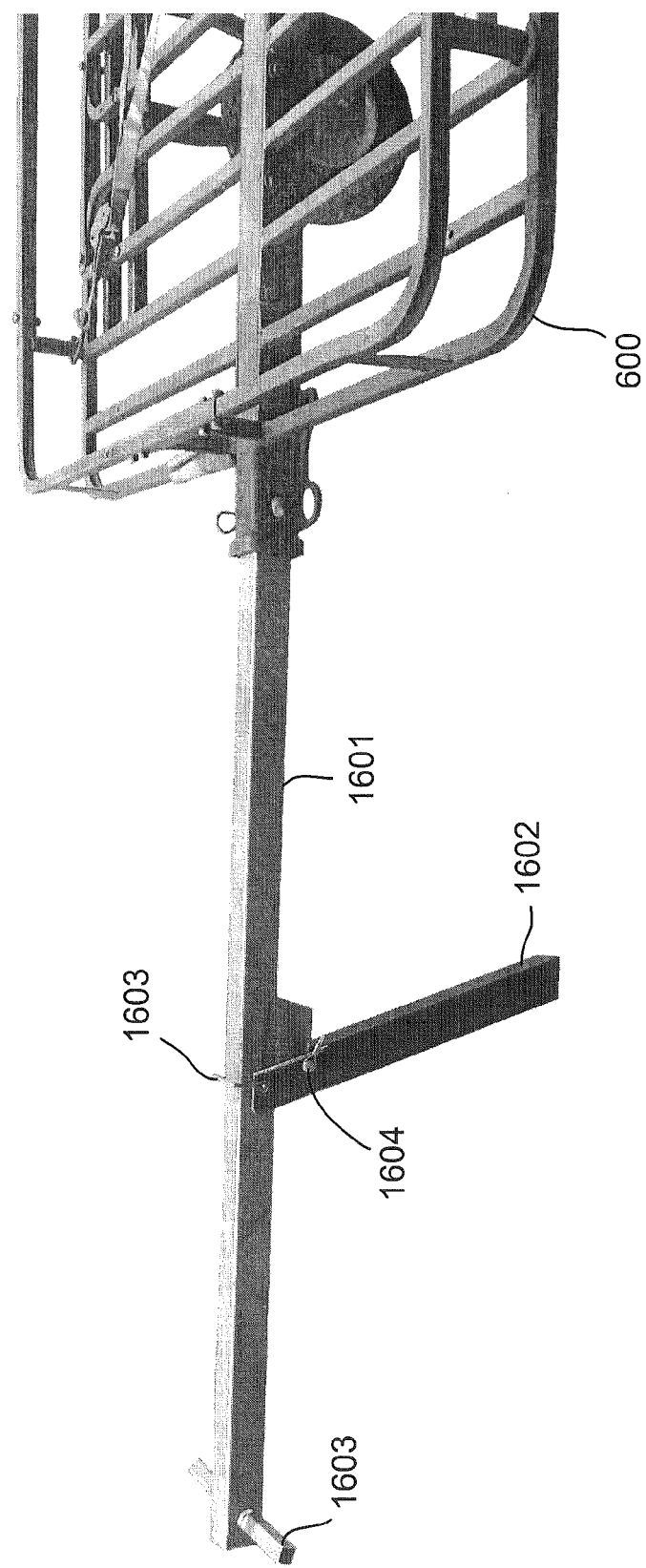
FIG. 16 shows a convertible handle mechanism that can be used with the cart of the various embodiments depicted above.

FIG. 16 shows a convertible handle mechanism 1601 that can be used with the cart of the various embodiments depicted above. Handle mechanism 1601 includes a leg support 1602 and a handle 1603. Leg support 1602 can be placed in a down position, as shown in FIG. 16, in order to support the cart and keep it elevated when not being moved by a user. Pins 1603 and 1604 secure leg support 1602 to prevent it from slipping when extended. When a user wants to move the cart, pins 1603, 1604 are removed and the leg support 1602 can be retracted into a position approximately parallel to the handle 1601, as shown in FIG. 17.

Figure 17:
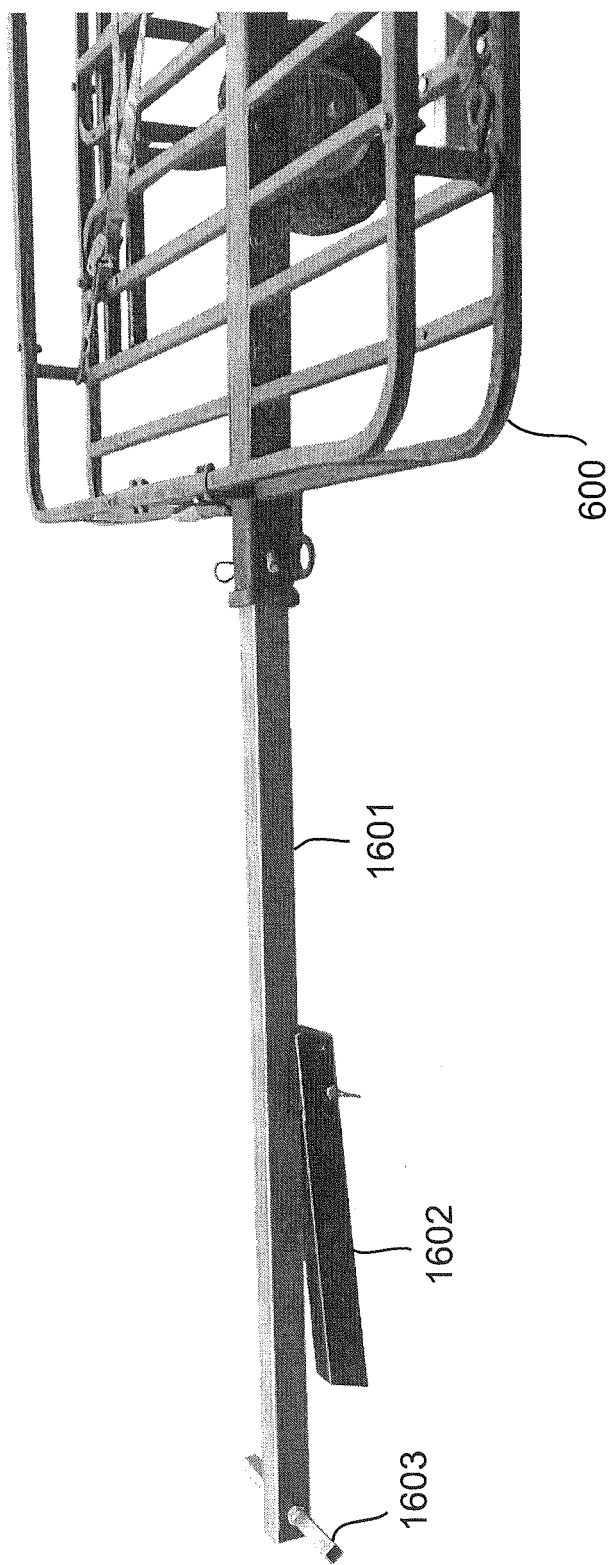
FIG. 17 shows the convertible handle mechanism of FIG. 16 with a support leg retracted.
Figure 18:
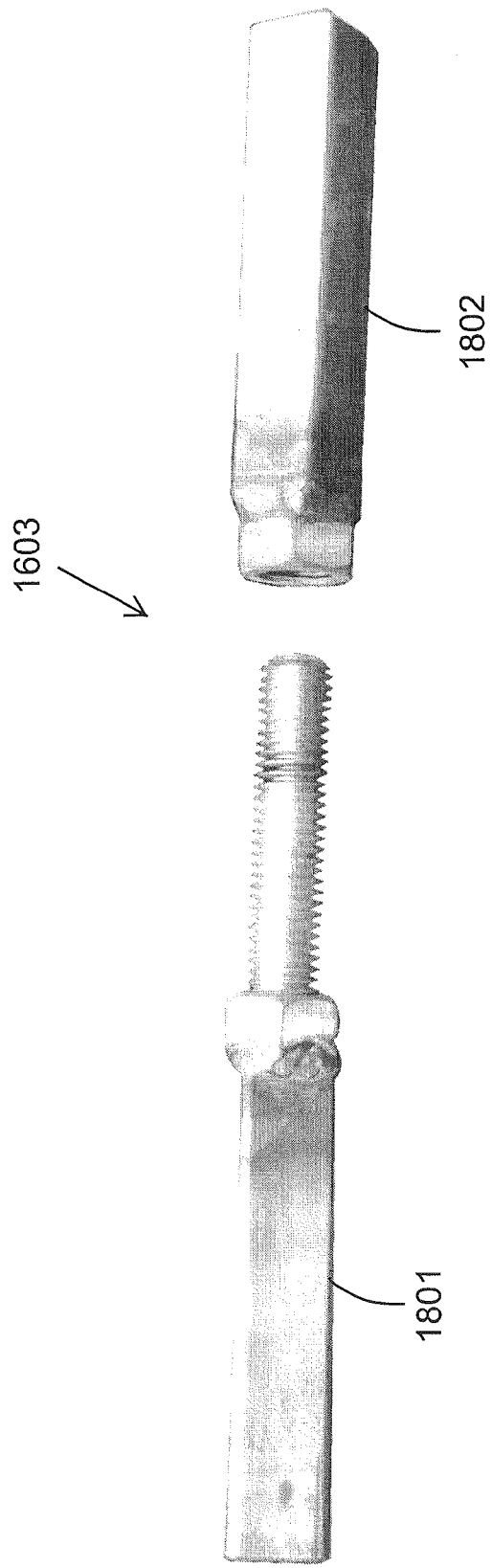
FIG. 18 shows a handle member that can be used with the convertible handle mechanism of FIGS. 16-17.
Figure 19:
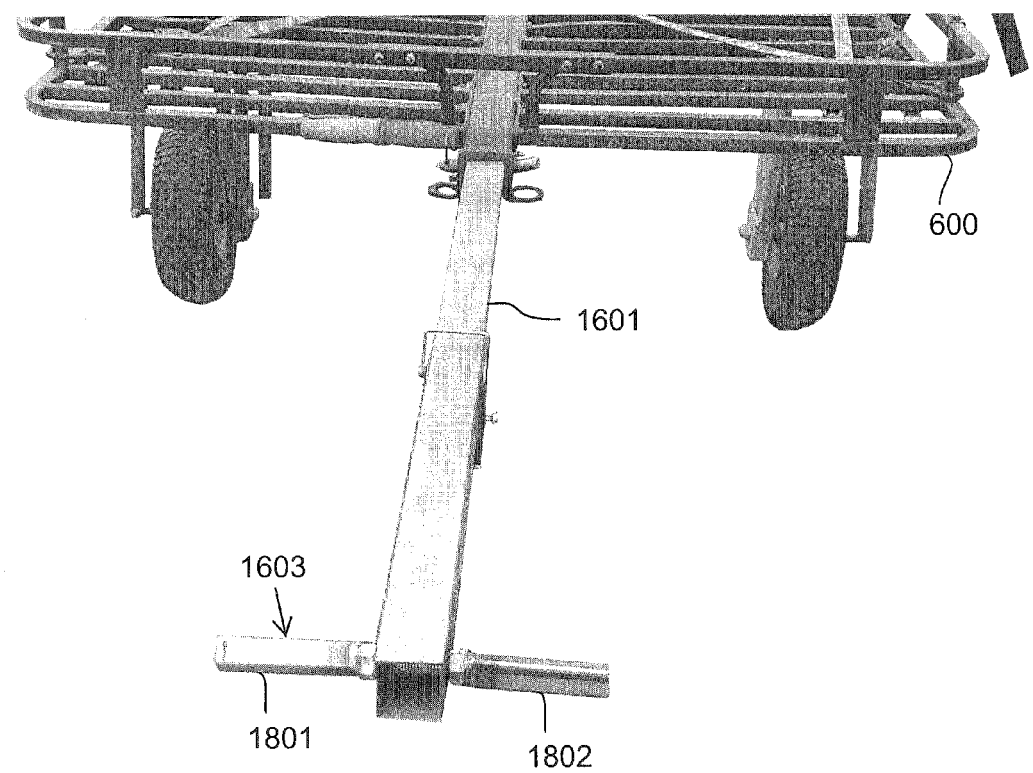
FIG. 19 shows the convertible handle mechanism of FIGS. 16-17 from a front view.

FIGS. 16 and 17 also show a handle 1603 placed at one end of handle mechanism 1601 to facilitate movement of the cart by a user. The handle 1603 is shown in more detail in FIG. 18 and comprises two pieces, 1801 and 1802, which can be screwed together through appropriate holes in the handle mechanism 1601 shown in FIGS. 16 and 17. Handle 1603 can optionally have some padding to make use of the handle more comfortable to a user. FIG. 19 shows a front view of the handle mechanism 1601 showing the handle 1603 and its two component parts 1801, 1802.

Figure 20:
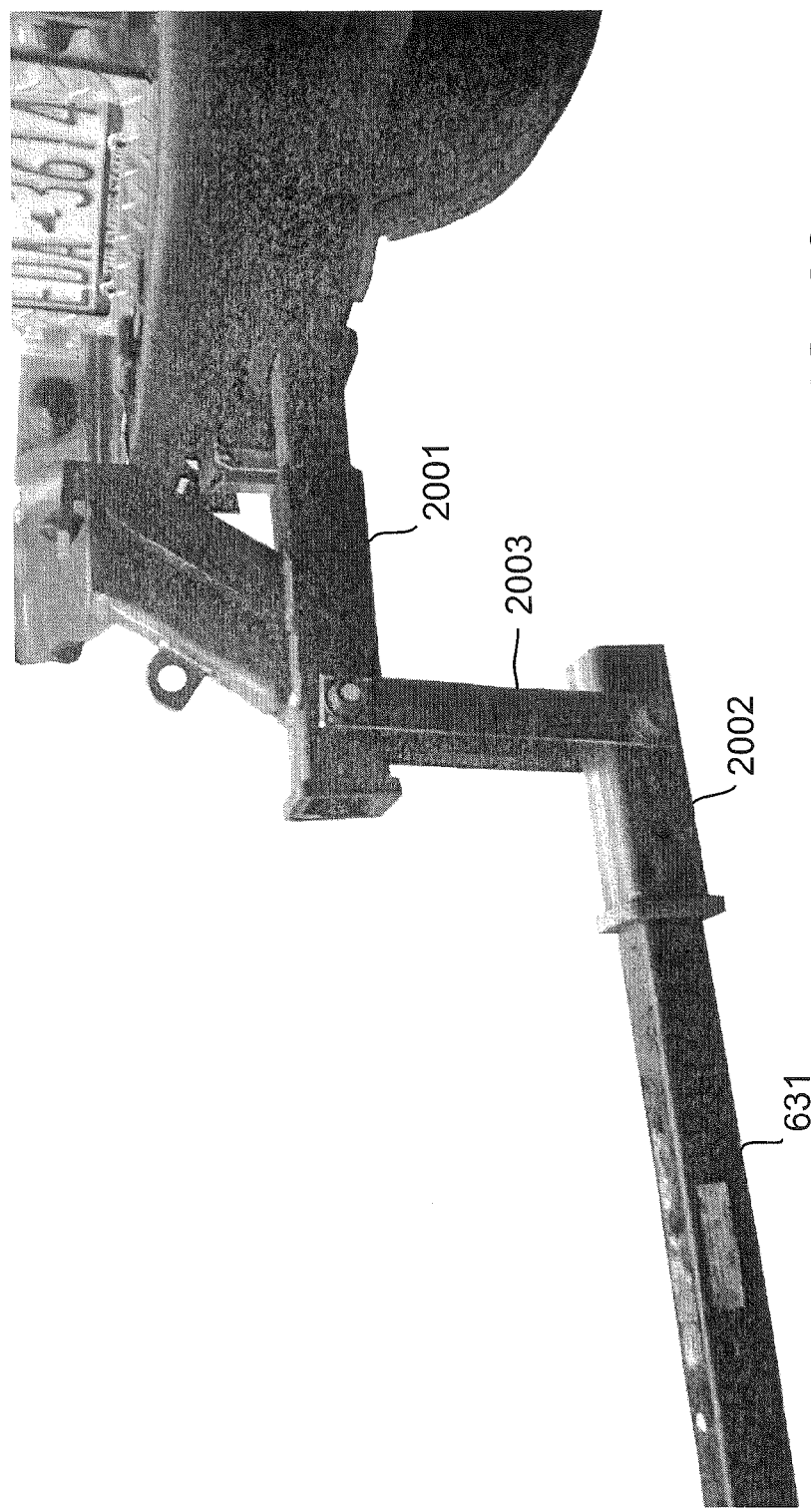
FIG. 20 shows a trailer hitch assembly that can be used to secure the cart of any of the embodiments discussed above to a vehicle, with the assembly in a down position.
Figure 21:
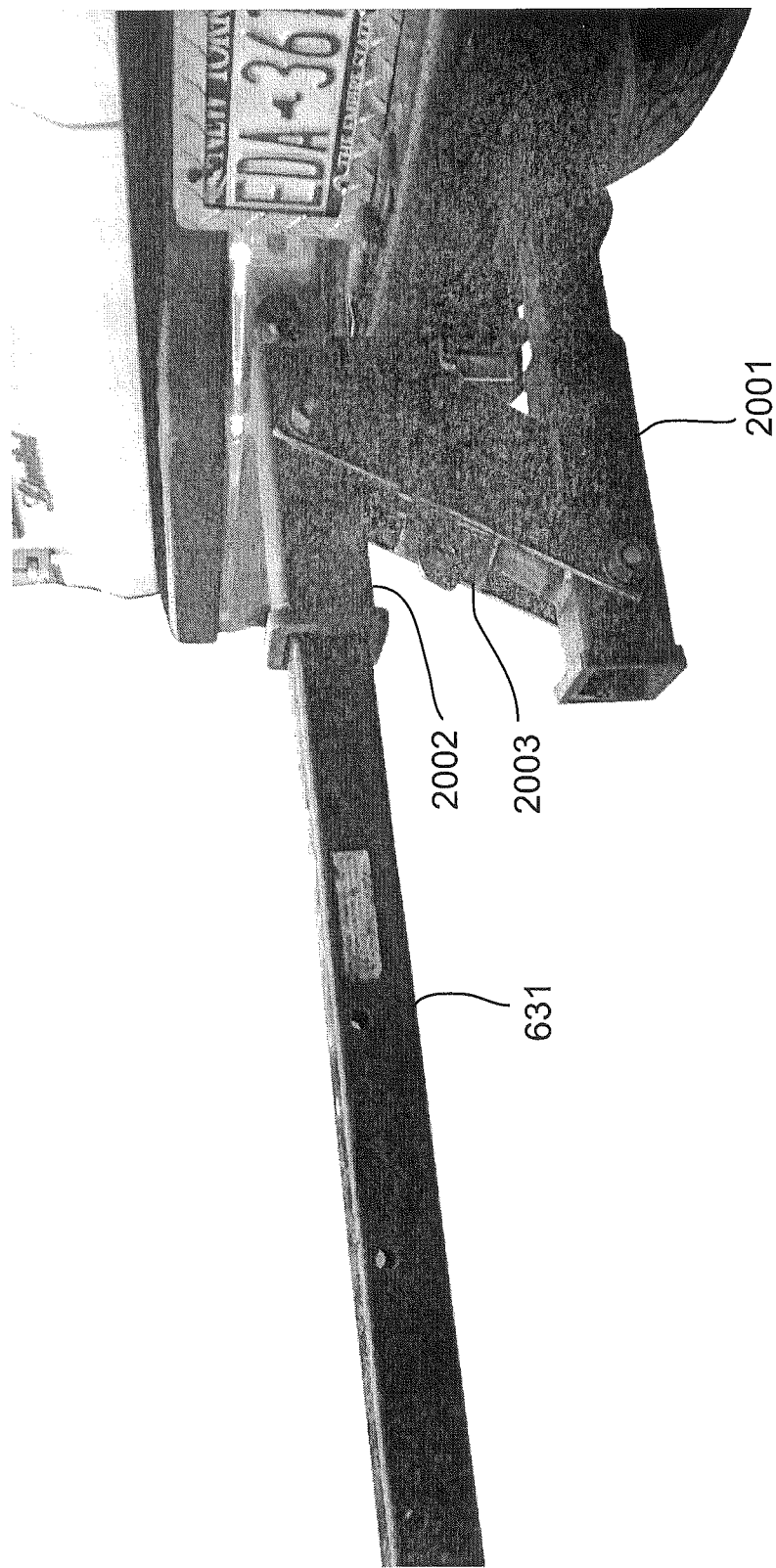
FIG. 21 shows the trailer hitch assembly of FIG. 20 in a raised position.
Figure 22:
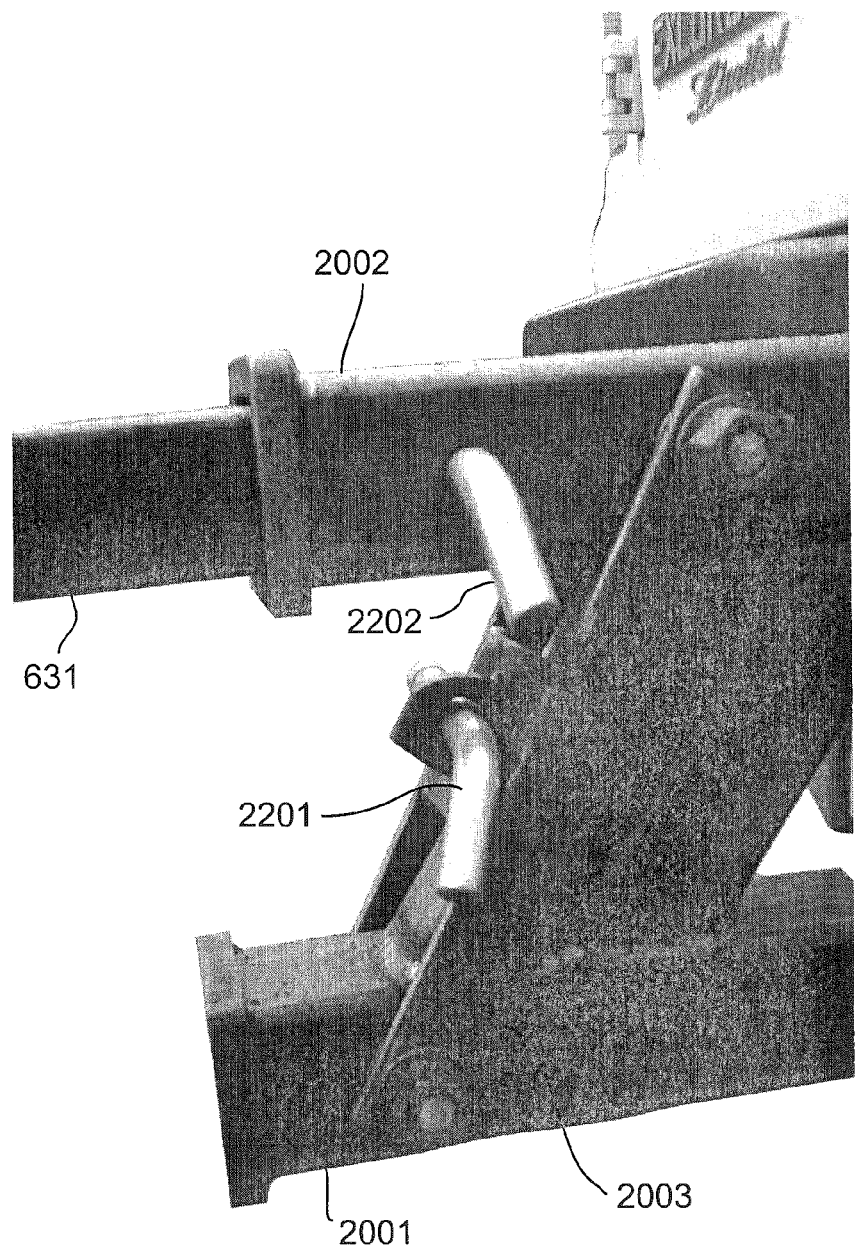
FIG. 22 shows the trailer hitch assembly of FIGS. 20-21 in a raised position with locking pins inserted.

FIG. 20 shows a trailer hitch assembly comprising three main components: a fixed receiver 2001, a movable receiver 2002, a and a bracket 2003 that connects the receivers 2001 and 2002. As described above in connection with FIGS. 7-8, a connection attachment member 631 of basket 600 is used to secure the basket 600 to a vehicle for towing. In the alternative embodiment shown in FIG. 20, the connection attachment member 631 is pushed into the movable receiver 2002 and secured with a pin (not shown) that is placed through holes in attachment member 631 and receiver 2002. Once the attachment member 631 is secured to movable receiver 2002, movable receiver 2002 can be raised above fixed receiver 2001, as shown in FIG. 21. The movement of movable receiver 2002 to the position shown in FIG. 21 will effectively raise basket 600 (not shown in FIG. 21). It may be better to have basket 600 in such a raised position, particularly when being towed over rough terrain. As shown in FIG. 22, locking pins 2201 and 2202 are used to secure movable receiver in its upper position and to secure attachment member 631 in movable receiver 2002.

Figure 23:
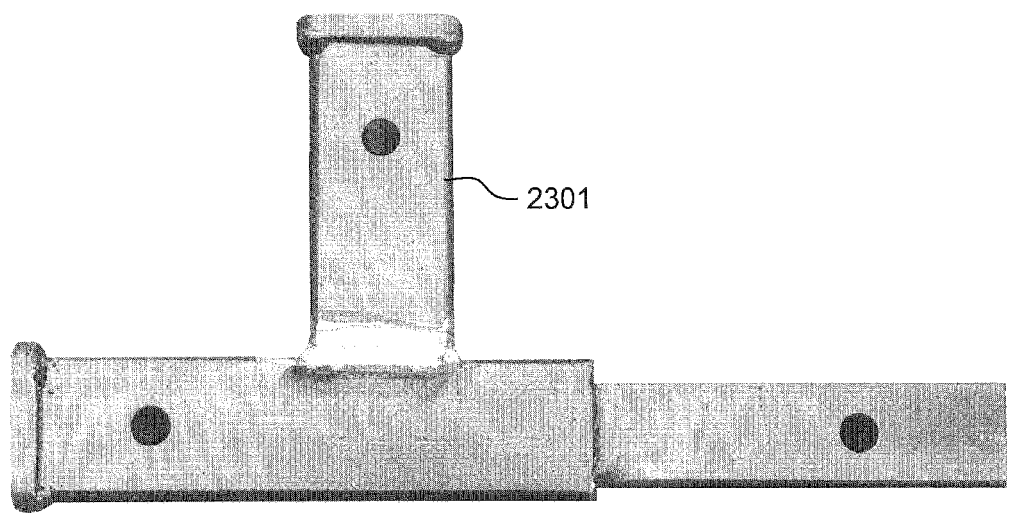
FIG. 23 shows a platform support member that can be used when coupling a cart to a vehicle so as to allow for the placement of a platform.
Figure 24:
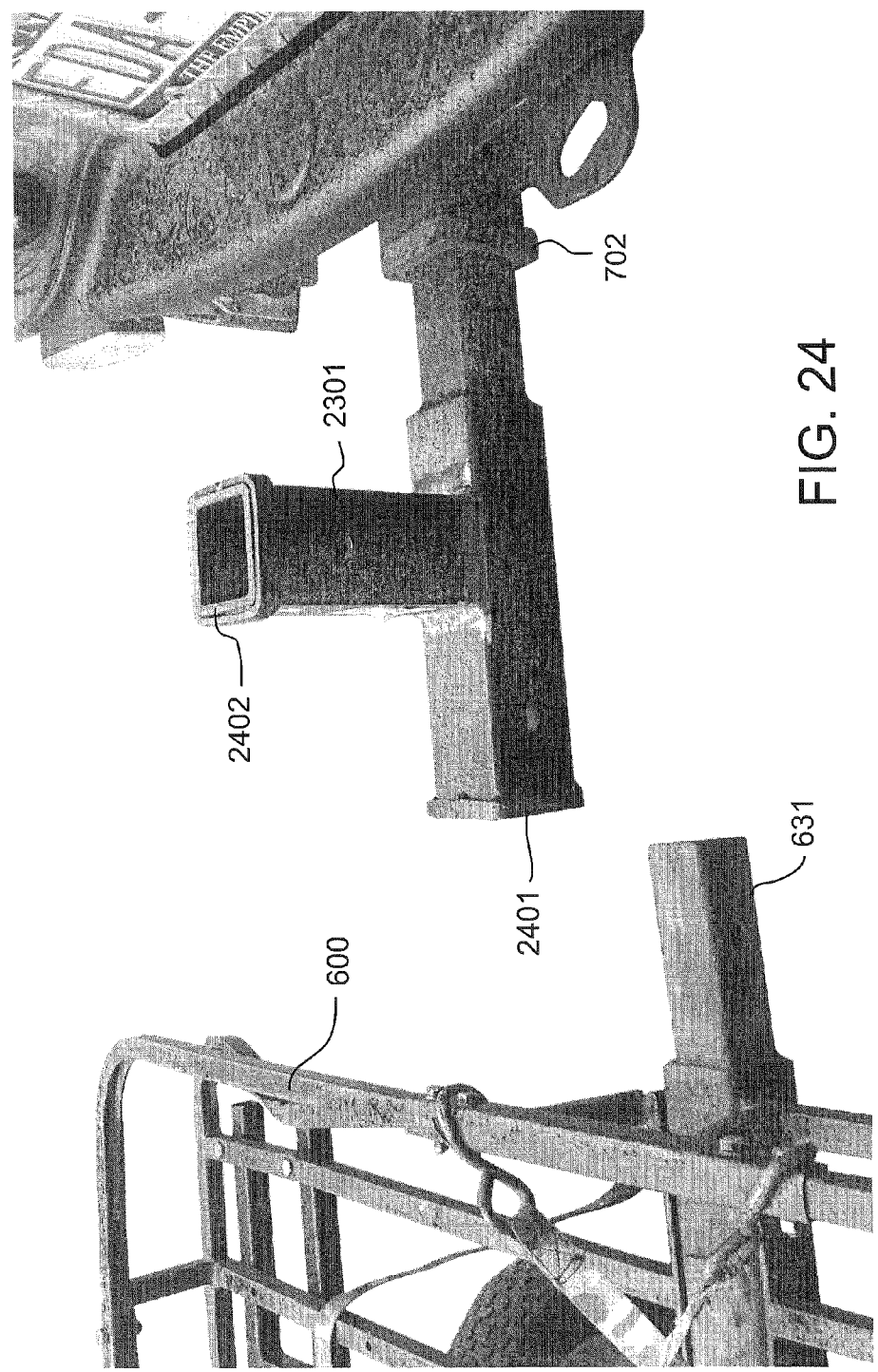
FIG. 24 shows the platform support member of FIG. 23 connected to a vehicle.

Under certain circumstances it may be desirable to have a solid platform supported near the cart 600 for various purposes, such as the placement of a small crane. FIG. 23 shows platform support member 2301, which may be mounted into a trailer hitch 702, as shown in FIG. 24. Platform support member 2301 has a horizontal facing opening 2401 which can receive the attachment member 631 of the cart 600. Platform support member 2301 also has an upward facing opening 2402 which can receive a support bar of a platform, as described below.

Figure 25:
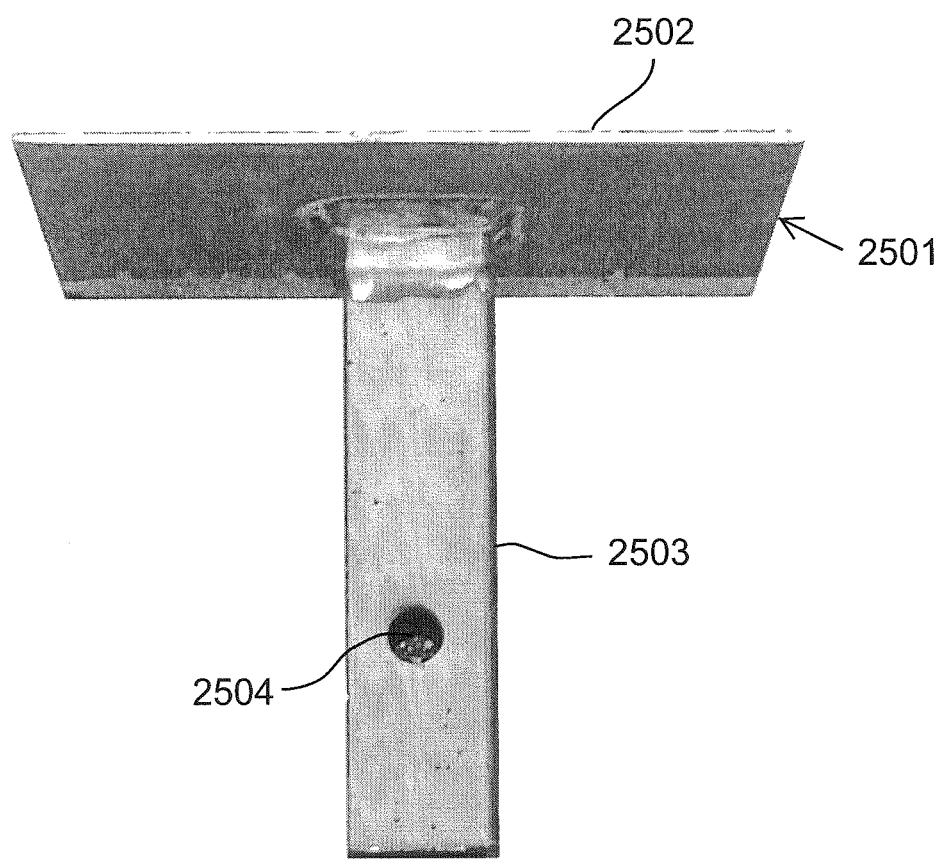
FIG. 25 shows a platform that can be used with the platform support member of FIGS. 23-24.
Figure 26:
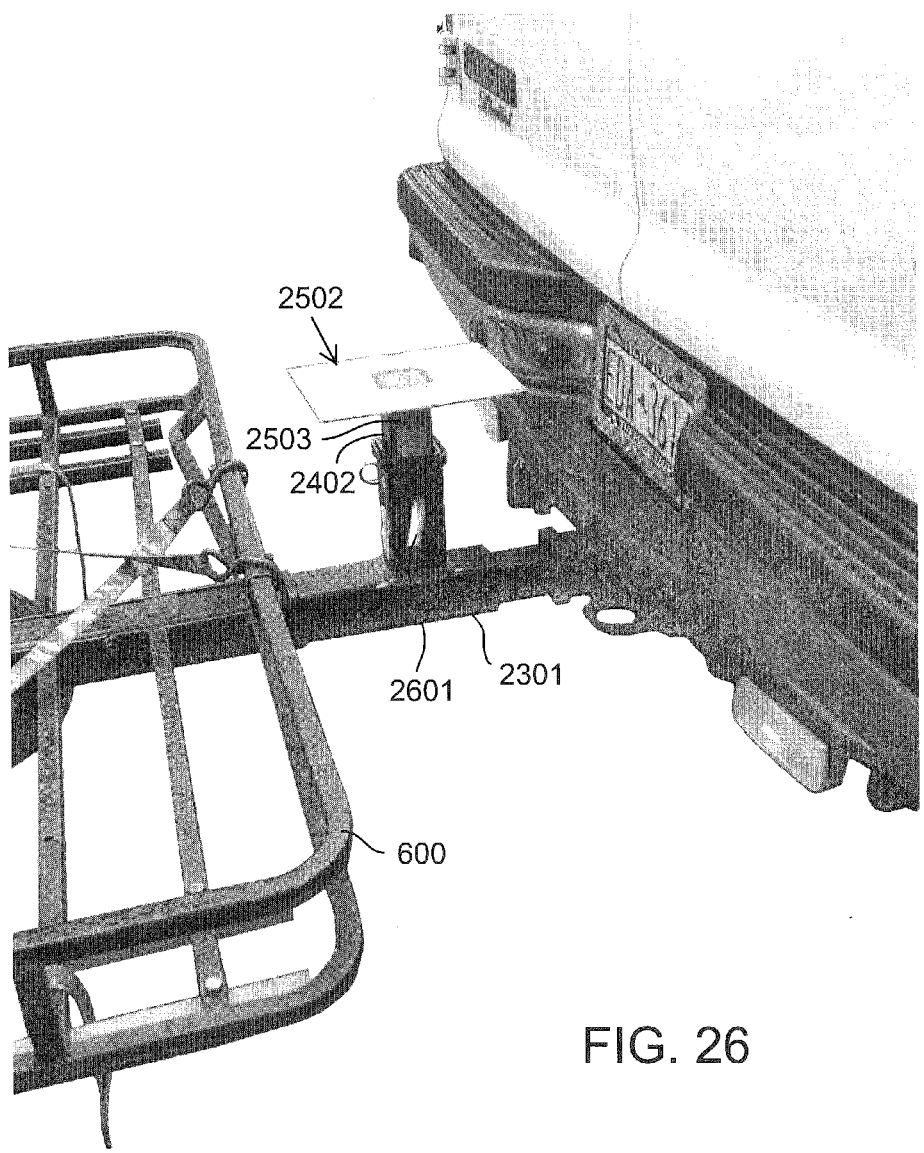
FIG. 26 shows the platform support member of FIGS. 23-24 connected to a vehicle with the platform of FIG. 25 inserted therein and locked.

FIG. 25 shows a platform structure 2501 comprising two main portions: an upper platform portion 2502 and a lower support bar 2503 that includes holes 2504. As shown in FIG. 26, the lower support bar 2503 of platform structure 2501 can be placed within the upper opening 2402 of platform support member 2301. The holes 2504 will line up with holes in platform support member 2301 such that pin 2601 can be placed to secure platform structure 2501 in place. The upper platform portion 2502 is now available close to cart 600 for a variety of purposes, such as the placement of a small crane to load and unload materials onto and off of cart 600.

Figure 27:
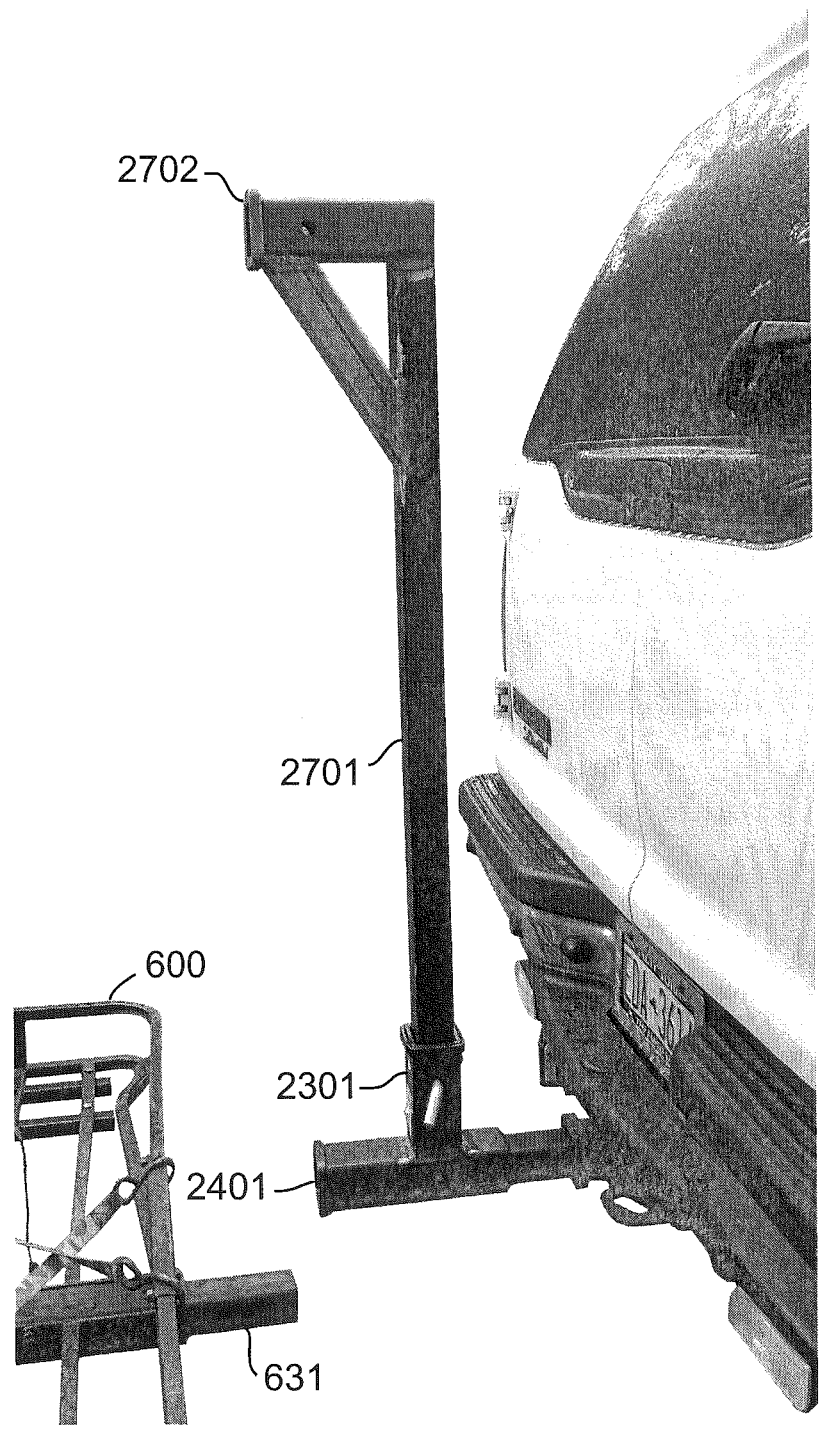
FIG. 27 shows a vertical receiver for a second cart to enable more than one cart to be towed by a vehicle.

FIG. 27 shows a vertical receiver 2701, which may be inserted into platform support member 2301. Vertical receiver 2701 has a horizontal facing opening 2702 similar to horizontal facing opening 2401. When vertical receiver 2701 is used, a second cart 600 can be secured to vertical receiver 2701 using opening 2702. This allows two carts to be transported by the same vehicle. The height of the vertical receiver 2701 can be varied, or made adjustable using an adjustable vertical component of vertical receiver 2701, depending on whether the carts are to be transported empty or with materials loaded thereon. As a further alternative embodiment, additional horizontal facing openings with appropriate horizontal support members may be used to allow the stacking of more carts.

Figure 28:
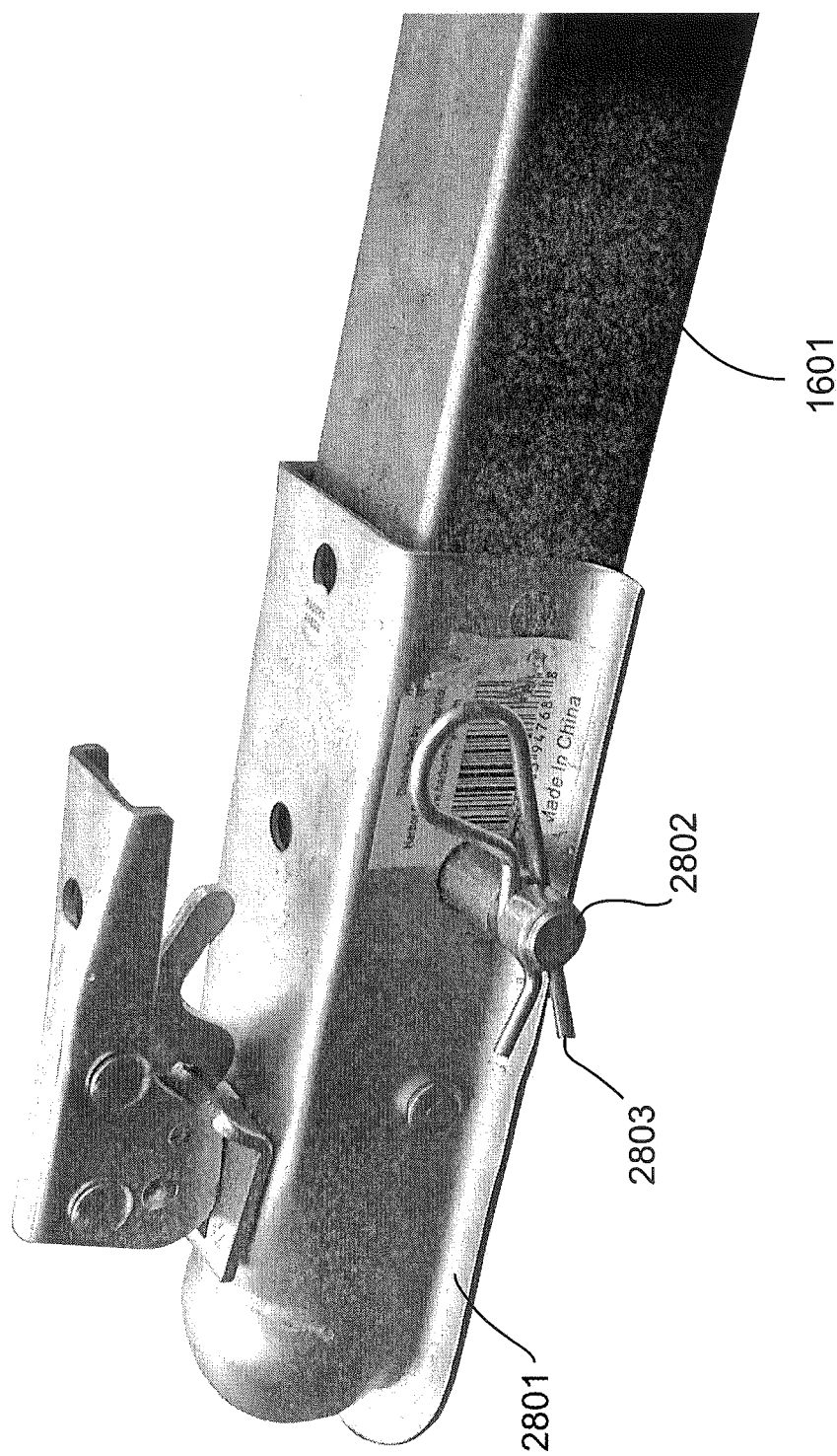
FIG. 28 shows a trailer attachment that converts the handle into a tow bar.

FIG. 28 shows a trailer attachment 2801 that can be attached to handle 1601 using a pin 2802 and locking mechanism 2803. This converts the handle into a tow bar allowing the cart to be used as a light duty off road trailer. Trailer attachment 2801 can be purchased in many retail stores.

Although the disclosure has been provided and illustrated in connection with certain embodiments, the present invention can, however, be embodied in many different forms and should not be construed as limited to the disclosed embodiments set forth herein; rather, these embodiments are provided so that this disclosure will be thorough and complete, and will fully convey the scope of the invention to those skilled in the art. The present invention may be implemented with different combinations of structural components. It will be appreciated by those skilled in the art that changes could be made to the embodiments described herein without departing from the broad inventive concept thereof. It is understood, therefore, that this invention is not limited to the particular examples disclosed, but it is intended to cover modifications within the spirit and scope of the invention as defined by the appended claims.

What is claimed is:

1. A retractable wheel assembly, comprising:
a support structure having bottom and side portions;
a wheel having an axle;
a wheel retraction assembly including a fixed strut connecting one end of the wheel axle to the support structure, and a telescopic strut connecting the opposite end of the wheel axle to the support structure;
wherein one end of the fixed strut is fixedly mounted to the wheel axle and the other end is pivotally mounted to a side portion of the support structure; and
wherein one end of the telescopic strut is fixedly mounted to the wheel axle and the other end is pivotally mounted to the bottom portion of the support structure, with the telescopic strut movable between retracted and expanded positions, wherein the retracted position maintains the wheel in an operative position with the struts positioned essentially perpendicular to the support structure to enable the support structure to be moved upon the first wheel to transport cargo that is placed on the support structure, while in the retracted position the wheel is placed in an inoperative position with the struts essentially parallel to the first support structure.

2. The retractable wheel assembly of claim 1, wherein the telescopic strut includes first and second rectangular or square tubing sections in sliding engagement.

3. The retractable wheel assembly of claim 1, further comprising a quick release connector for maintaining the telescopic strut in the retracted or expanded position.

4. The retractable wheel assembly of claim 3 wherein the quick release connector comprises holes on one tubing section corresponding to the retracted and expanded positions and a button associated with the other tubing section for engaging one of the holes to hold the telescopic strut in the retracted or expanded position.

5. The retractable wheel assembly of claim 1 wherein the fixed strut includes first and second fixed strut members one end of each which is attached to the first support structure and the other end of each is engaged with one end of the first wheel axle.

6. A convertible cart for transport of cargo, comprising:
a first support structure;
a first wheel having an axle;
a first wheel retraction assembly operatively associated with the first support structure, and including a fixed strut for mounting one end of the first wheel axle to the first support structure and a telescopic strut connecting the opposite end of the first wheel axle to the first support structure, with the telescopic strut movable between retracted and expanded positions, wherein the retracted position maintains the first wheel in a position to enable the cart to be moved upon the first wheel and the expanded position moves the first wheel to another position adjacent the first support structure wherein the wheel does not support the cart.

7. The cart of claim 6 further comprising a connection attachment member configured and dimensioned for attachment to a trailer hitch of a vehicle for transport of the cart.

8. The cart of claim 6 further comprising a basket or plate member attached to the first support structure for assisting in supporting cargo to be transported by the cart.

9. The cart of claim 6 wherein the telescopic strut includes first and second rectangular or square tubing sections in sliding engagement.

10. The cart of claim 6, further comprising a quick release connector for maintaining the telescopic strut in the retracted or expanded position.

11. The cart of claim 10 wherein the quick release connector comprises holes on one tubing section corresponding to the retracted and expanded positions and a button associated with the other tubing section for engaging one of the holes to hold the telescopic strut in the retracted or expanded position.

12. The cart of claim 6 wherein the fixed strut includes first and second fixed strut members one end of each which is attached to the first support structure and the other end of each is engaged with one end of the first wheel axle.

13. The cart of claim 6 further comprising:
a second support structure;
a second wheel having an axle;
a second wheel retraction assembly operatively associated with the second support structure, and including a fixed strut for mounting one end of the second wheel axle to the second support structure and a telescopic strut connecting the opposite end of the second wheel axle to the second support structure, with the telescopic strut movable between retracted and expanded positions, wherein the retracted position maintains the second wheel in a position to enable the cart to be moved upon the second wheel and the expanded position moves the second wheel to another position to be adjacent the second support structure wherein the wheel does not support the cart.

14. The cart of claim 13, wherein the fixed strut of the second wheel retraction assembly includes first and second fixed strut members one end of each which is attached to the second support structure and the other end of each is engaged with one end of the second wheel axle.

15. The cart of claim 6 further comprising:
a second wheel having an axle;
a second wheel retraction assembly operatively associated with the first support structure, and including a fixed strut for mounting one end of the second wheel axle to the second support structure and a telescopic strut connecting the opposite end of the second wheel axle to the first support structure, with the telescopic strut movable between retracted and expanded positions, wherein the retracted position maintains the second wheel in a position to enable the cart to be moved upon the second wheel and the expanded position moves the second wheel to another position adjacent the first support structure wherein the wheel does not support the cart.

16. The cart of claim 15, wherein the second support structure is attached or connected to the first support structure by structural members, a separate basket or a plate member attached to the first support structure so that the second support structure can assist in supporting cargo to be transported by the cart.

17. The cart of claim 15, wherein the telescopic strut of the second wheel retraction assembly includes first and second rectangular or square tubing sections in sliding engagement.

18. The cart of claim 17, further comprising a quick release connector for maintaining the telescopic strut of the second wheel retraction assembly in the retracted or expanded position.

19. The cart of claim 18, wherein the quick release connector comprises holes on one tubing section of the telescopic strut of the second wheel retraction assembly corresponding to the retracted and expanded positions and a button associated with the other tubing section of the telescopic strut of the second wheel retraction assembly for engaging one of the holes to hold the telescopic strut of the second wheel retraction assembly in the retracted or expanded position.

20. A convertible cart for transport of cargo, comprising:
a support structure;
a wheel having an axle;
a wheel retraction assembly operatively associated with the support structure, and including a fixed strut for mounting one end of the wheel axle to the support structure and a telescopic strut connecting the opposite end of the wheel axle to the support structure, with the telescopic strut movable between retracted and expanded positions, wherein the retracted position maintains the wheel in a position to enable the cart to be moved upon the wheel and the expanded position moves the wheel to another position adjacent the support structure wherein the wheel does not support the cart;
a first connection mechanism connecting the telescopic strut to the support structure, the first connection mechanism including a bracket, the bracket having an opening facing toward the wheel in the expanded position; and
a second connection mechanism connecting the fixed strut to the support structure, the second connection mechanism including an additional bracket, the additional bracket having an additional opening facing toward the wheel in the retracted position.

* * * * *